United States Patent
Chen

(10) Patent No.: US 12,342,027 B2
(45) Date of Patent: Jun. 24, 2025

(54) VIDEO PROJECTION METHOD, APPARATUS AND DEVICE, AND STORAGE MEDIUM

(71) Applicant: Tencent Technology (Shenzhen) Company Limited, Shenzhen (CN)

(72) Inventor: Huiming Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 85 days.

(21) Appl. No.: 17/726,425

(22) Filed: Apr. 21, 2022

(65) Prior Publication Data

US 2022/0248077 A1 Aug. 4, 2022

Related U.S. Application Data

(63) Continuation of application No. PCT/CN2021/095125, filed on May 21, 2021.

(30) Foreign Application Priority Data

Jul. 10, 2020 (CN) .......................... 202010667767.5

(51) Int. Cl.
    *H04N 21/41* (2011.01)
    *H04N 21/422* (2011.01)
    *H04N 21/472* (2011.01)

(52) U.S. Cl.
    CPC ... *H04N 21/41265* (2020.08); *H04N 21/4122* (2013.01); *H04N 21/42222* (2013.01); *H04N 21/47217* (2013.01)

(58) Field of Classification Search
    None
    See application file for complete search history.

(56) References Cited

U.S. PATENT DOCUMENTS

| 10,643,666 B2* | 5/2020 | Liu | ..................... H04N 21/8547 |
| 2014/0125554 A1* | 5/2014 | Pan | ........................... G06T 3/40 345/2.2 |

(Continued)

FOREIGN PATENT DOCUMENTS

| CN | 103442296 A | 12/2013 |
| CN | 103686325 A | 3/2014 |

(Continued)

OTHER PUBLICATIONS

Tencent Technology, ISR, PCT/CN2021/095125, Aug. 13, 2021, 2 pgs.

(Continued)

*Primary Examiner* — Samira Monshi
(74) *Attorney, Agent, or Firm* — Morgan, Lewis & Bockius LLP

(57) ABSTRACT

An electronic device plays a target video in a first page of a first application (APP). The device detects a screen projection triggering event when a playing progress of the target video in the first page reaches a first progress, In response to the detecting, the device causes the target video to project onto a target screen projection device so that the target video continues to be played in a second page of the target screen projection device from the first progress. In response to detecting a screen projection stopping triggering event when a playing progress of the target video in the target screen projection device reaches a second progress, the electronic device continues to play the target video in the first page of the first APP of the electronic device from the second progress.

20 Claims, 16 Drawing Sheets

(56) References Cited

U.S. PATENT DOCUMENTS

2016/0353162 A1* 12/2016 Kan ............... H04N 21/439
2021/0014335 A1*  1/2021 Elcock ........... H04N 21/44231
2021/0255826 A1*  8/2021 Devine ............ G06F 3/167
2022/0004315 A1*  1/2022 Zhang ............ G06F 3/04886

FOREIGN PATENT DOCUMENTS

| CN | 105338425 A | 2/2016 |
| CN | 106095084 A | 11/2016 |
| CN | 107659712 A | 2/2018 |
| CN | 109889885 A | 6/2019 |
| CN | 110389736 A | 10/2019 |
| CN | 110740363 A | 1/2020 |
| CN | 111246306 A | 6/2020 |
| CN | 111770379 A | 10/2020 |
| KR | 20150068587 A | 6/2015 |

OTHER PUBLICATIONS

Tencent Technology, WO, PCT/CN2021/095125, Aug. 13, 2021, 5 pgs.
Tencent Technology, IPRP, PCT/CN2021/095125, Jan. 10, 2023, 6 pgs.

* cited by examiner

VIDEO PROJECTION METHOD, APPARATUS AND DEVICE, AND STORAGE MEDIUM

CROSS-REFERENCE TO RELATED APPLICATIONS

This application is a continuation application of PCT Patent Application No. PCT/CN2021/095125, entitled "VIDEO PROJECTING METHOD, DEVICE, EQUIPMENT, AND STORAGE MEDIUM" filed on May 21, 2021, which claims priority to Chinese Patent Application No. 202010667767.5, filed with the State Intellectual Property Office of the People's Republic of China on Jul. 10, 2020, and entitled "VIDEO PROJECTION METHOD, APPARATUS, AND DEVICE", all of which are incorporated herein by reference in their entirety.

FIELD OF THE TECHNOLOGY

This application relates to the technical field of Internet, specifically the technical field of wireless screen projection, and particularly to a video projection method, a video projection apparatus, a video projection device, and a storage medium.

BACKGROUND OF THE DISCLOSURE

A wireless screen projection technology refers to a technology of projecting a picture on a terminal (e.g., a mobile phone or a tablet computer) into a screen projection device (etc., a television or a computer display). With the development of an Internet technology, the wireless screen projection technology has been applied relatively extensively to the field of video playing. Common application scenarios include the projection of a video being played in a terminal (e.g., an electronic device, such as a mobile phone) to a television for playing through the wireless screen projection technology.

SUMMARY

Embodiments of this application provide a video projection method, apparatus and device, and a storage medium. A terminal and a target screen projection device may be switched to continuously play a target video in a screen projection process, and a playing progress of the target video may be synchronized relatively well in real time between the terminal and the target screen projection device to improve a screen projection effect of the video.

According to an aspect, an embodiment of this application provides a video projection method, including:
  playing a target video in a first page of a first application (APP) in a terminal;
  projecting, in response to detecting a screen projection triggering event in accordance with a determination that a playing progress of the target video in the first page reaches a first progress, the target video into a target screen projection device for playing in a manner that the target video continues to be played in a second page of the target screen projection device from the first progress; and
  continuing to play the target video in the first page from a second progress in response to detecting a screen projection stopping triggering event in accordance with a determination that a playing progress of the target video in the target screen projection device reaches the second progress,
  the screen projection triggering event including an event making the first APP in an inactive state (e.g., the event switches the first APP from an active state to an inactive state, the event deactivates the first APP, etc.), and the screen projection stopping triggering event including an event making the first APP in an active state (e.g., the event activates the first APP).

According to another aspect, an embodiment of this application provides a video projection method, including:
  playing a target video in a second page from a first progress in response to a screen projection instruction of a terminal, the screen projection instruction being sent in accordance with a determination that a playing progress of the target video in a first page of a first APP in the terminal reaches the first progress and a screen projection triggering event is detected; and
  returning, in response to a screen projection stopping instruction of the terminal in accordance with a determination that a playing progress of the target video in the second page reaches a second progress, the target video to the terminal for playing in a manner that the target video continues to be played in the first page of the terminal from the second progress, the screen projection stopping instruction being sent by the terminal in response to detecting a screen projection stopping triggering event,
  the screen projection triggering event including an event making the first APP in an inactive state, and the screen projection stopping triggering event including an event making the first APP in an active state.

According to another aspect, an embodiment of this application provides a video projection apparatus, including:
  a display unit, configured to play a target video in a first page of a first APP in a terminal; and
  a processing unit, configured to project, in response to detecting a screen projection triggering event in accordance with a determination that a playing progress of the target video in the first page reaches a first progress, the target video into a target screen projection device for playing in a manner that the target video continues to be played in a second page of the target screen projection device from the first progress,
  the processing unit being further configured to continue to play the target video in the first page from a second progress in response to detecting a screen projection stopping triggering event in accordance with a determination that a playing progress of the target video in the target screen projection device reaches the second progress,
  the screen projection triggering event including an event making the first APP in an inactive state, and the screen projection stopping triggering event including an event making the first APP in an active state.

According to another aspect, an embodiment of this application provides a video projection apparatus, arranged in a video projection device and including:
  a display unit, configured to play a target video in a second page from a first progress in response to a screen projection instruction of a terminal, the screen projection instruction being sent in accordance with a determination that a playing progress of the target video in a first page of a first APP in the terminal reaches the first progress and a screen projection triggering event is detected; and a processing unit, configured to return, in response to a screen projection stopping instruction of the terminal in accordance with a determination that a playing progress of the target video in the second page reaches a second progress, the target video to the terminal for playing in a manner that the target video continues to be played in the first page of the terminal from the second progress, the screen projection stopping instruction being sent by the terminal in response to detecting a screen projection stopping triggering event, the screen projection triggering event including an event making the first APP in an inactive state, and the screen projection stopping triggering event including an event making the first APP in an active state.

According to another aspect, an embodiment of this application provides a video projection device, including:
 a processor, suitable for implementing a computer instruction; and,
 a non-transitory computer-readable storage medium, storing a computer instruction suitable for being loaded and executed by the processor to implement the above-mentioned video projection methods.

According to another aspect, an embodiment of this application provides a non-transitory computer-readable storage medium, storing a computer instruction which, when read and executed by a processor of a computer device, causes the computer device to execute the above-mentioned video projection methods.

According to another aspect, an embodiment of this application provides a computer program product or computer program, including a computer instruction stored in a computer-readable storage medium. A processor of a computer device reads the computer instruction from the computer-readable storage medium. The processor executes the computer instruction such that the computer device performs the above-mentioned video projection method.

BRIEF DESCRIPTION OF THE DRAWINGS

To describe the technical solutions in the embodiments of this application or in the related art more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

The technical solutions in the embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

The embodiments of this application relate to a video projection technology. The video projection technology refers to a technology of projecting a video being played in a terminal (e.g., a mobile phone) to a television for playing through a wireless screen projection technology.

In the embodiments of this application, a target video is projected, in response to detecting a screen projection triggering event in accordance with a determination that a playing progress of the target video in a first page of a terminal reaches a first progress, into a target screen projection device for playing in a manner that the target video continues to be played in a second page of the target screen projection device from the first progress, and the terminal continues to play the target video in the first page from a second progress in response to detecting a screen projection stopping triggering event in accordance with a determination that a playing progress of the target video in the target screen projection device reaches the second progress. In this process, the screen projection triggering event includes an event making a first APP in an inactive state (e.g., the first APP switches from an active state to an inactive state, the first APP is deactivated, etc.), and the screen projection stopping triggering event includes an event making the first APP in an active state (e.g., activates the first APP, maintains the first APP in an active state, etc.). The terminal and the target screen projection device may be switched flexibly to play the target video through the screen projection triggering event and the screen projection stopping triggering event, so as to meet a video projection requirement. In addition, the playing progress may still be synchronized between the terminal and the target screen projection device if the first APP of the terminal is in the inactive state, to continue to play the target video respectively. Therefore, a screen projection playing effect of the video is improved effectively.

A principle of the video projection technology involved in the embodiments of this application will be introduced below in combination with a schematic architecture diagram of a video projection system shown in FIG. 1 and a method flowchart of a video projection principle shown in FIG. 2.

Figure 1:
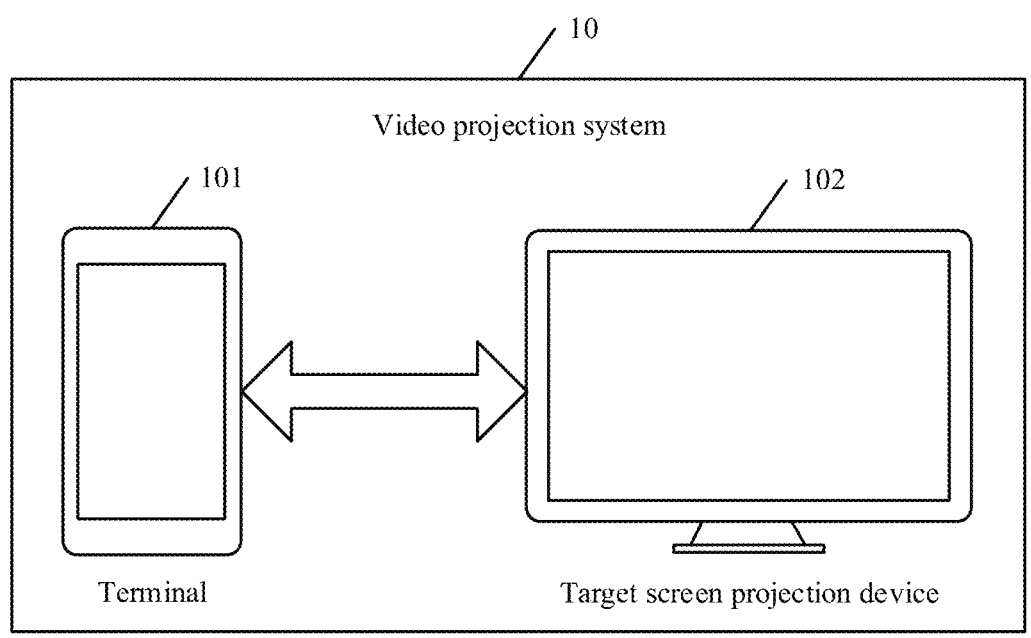
FIG. 1 is a schematic architecture diagram of a video projection system according to an exemplary embodiment of this application.

Referring to FIG. 1, FIG. 1 is a schematic architecture diagram of a video projection system according to an exemplary embodiment of this application. The video projection system 10 includes a terminal 101 and a target screen projection device 102. The terminal 101 may include, but is not limited to, a mobile phone, a tablet personal computer (PC), a notebook computer, an intelligent wearable device, etc. The terminal 101 may support various APPs to be installed and run. The APP may include, but is not limited to, a social APP (e.g., a MicroBlog APP, an instant messaging APP, or a map APP with a social function), an audio/video APP (e.g., a video player, or an audio player), a game APP, etc. In some embodiments, the terminal 101 may also support various types of detection hardware to be run, e.g., a gravity sensor (namely the terminal may detect a gravity sensing operation performed by a user of the terminal on the terminal, such as shaking and rotation, through the gravity sensor) or a position sensor. The terminal 101 may also support a touch screen function. The target screen projection device 102 may include, but is not limited to, a television terminal, a projector, a television set-top box, a display, etc. The television terminal may be an intelligent television terminal with a built-in screen projection function module, or an integrated screen projection device including a television set-top box and a display. The target screen projection device 102 may also support various APPs to be installed and run. The APP may include, but is not limited to, a social APP, an audio/video APP, a game APP, etc.

In this embodiment of this application, the terminal 101 needs to establish a communication connection with the target screen projection device 102. In some embodiments, the terminal 101 may establish a communication connection with the target screen projection device 102 through a local area network. The terminal 101 may also establish a communication connection with the target screen projection device 102 by near field communication. For example, the communication connection is established through wireless fidelity (Wi-Fi), Bluetooth, peer-to-peer (P2P), or other near field communication modes.

Figure 2:
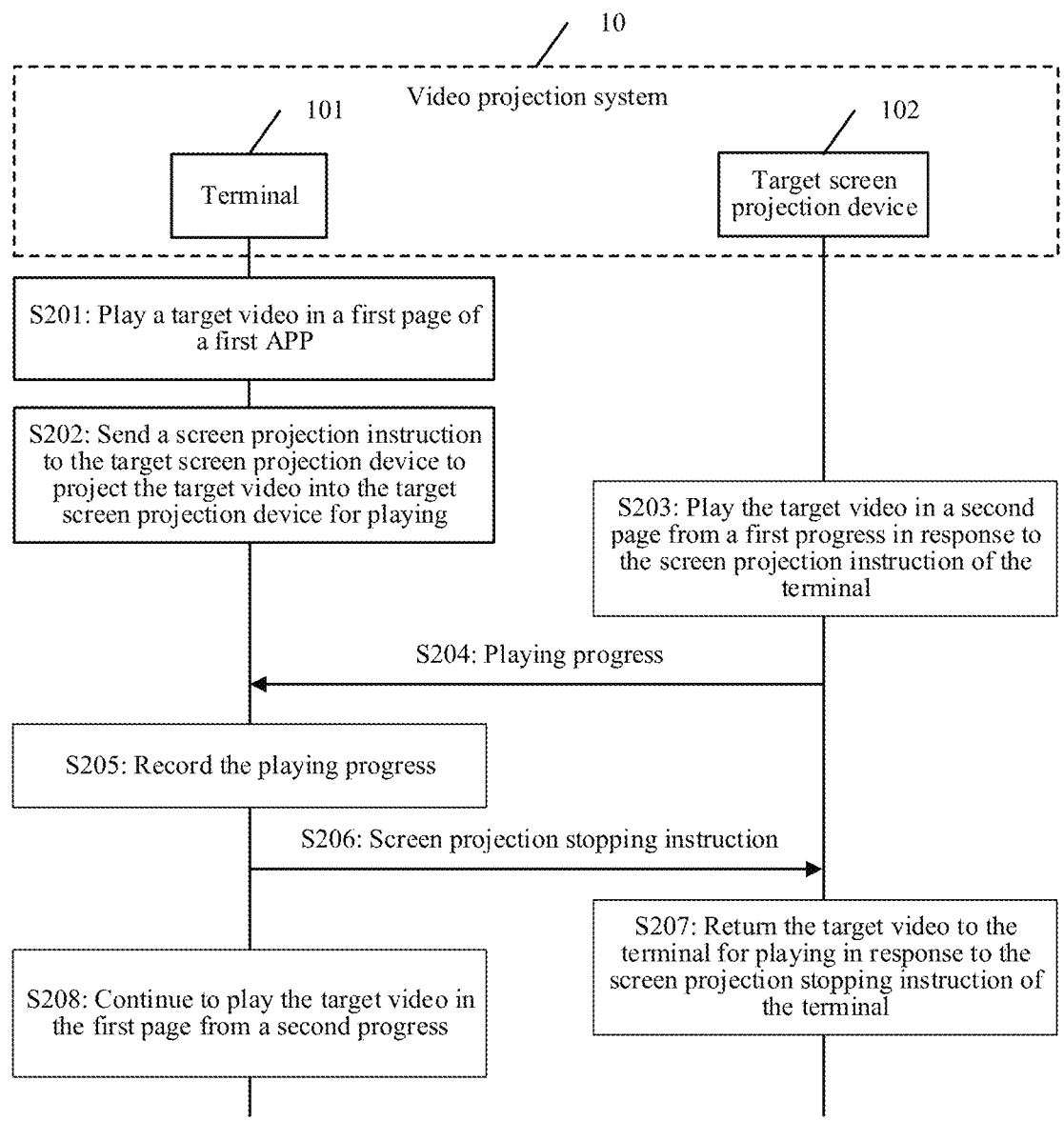
FIG. 2 is a schematic flowchart of a video projection principle according to an exemplary embodiment of this application.

Referring to FIG. 2, FIG. 2 is a schematic flowchart of a video projection principle according to an exemplary embodiment of this application. In a video projection system 10 including a terminal 101 and a target screen projection device 102, a principle of a video projection technology includes step S201 to step S208:

In step S201, a terminal plays a target video in a first page of a first application (APP).

Figure 3A:
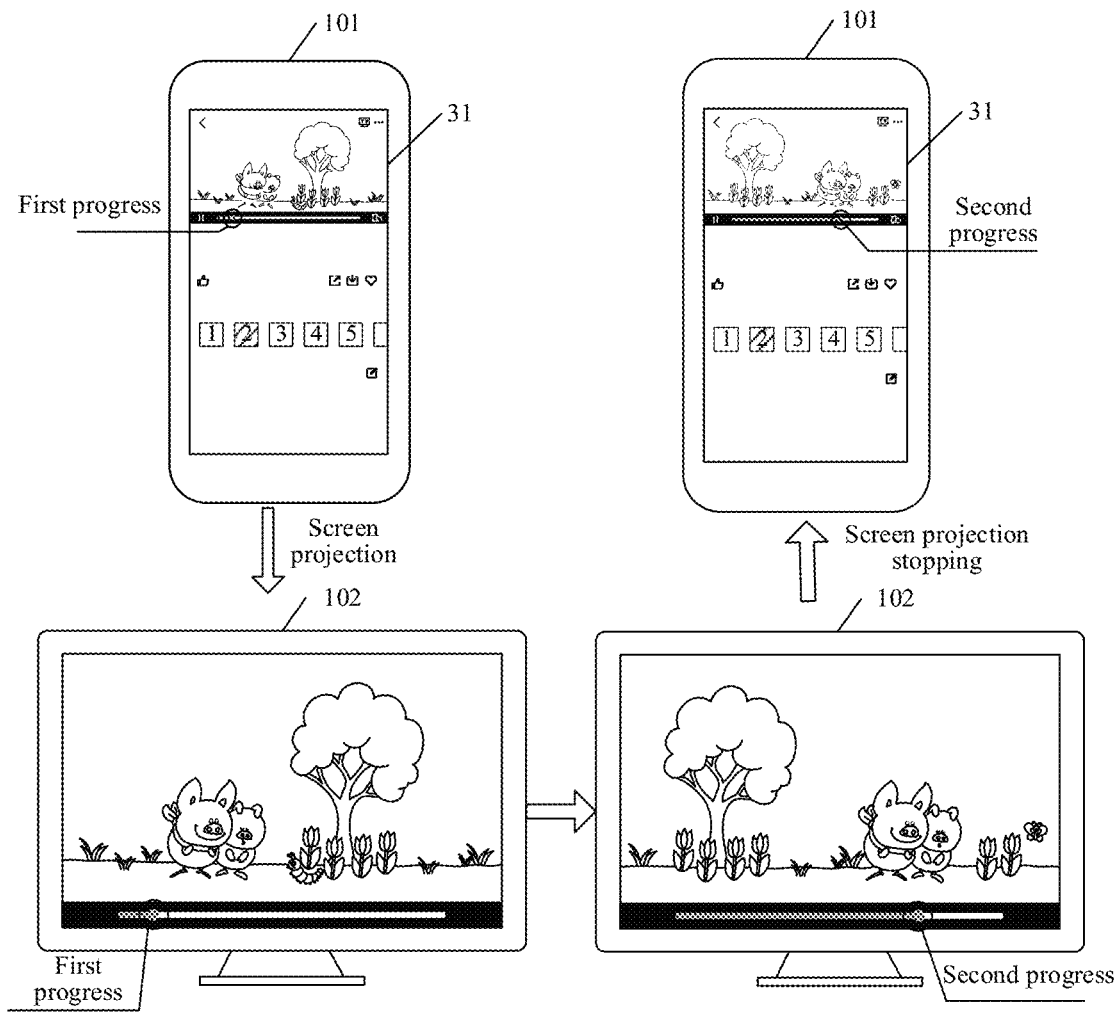
FIG. 3A is a schematic diagram of a video projection process according to an exemplary embodiment of this application.

In an implementation, the terminal may support various applications (APPs) to be installed and run. The first APP is any APP in the terminal. The first APP may include multiple service pages. The first page is any service page in the first APP. The first page may include a playing window, e.g., a playing window 31 shown in FIG. 3A. FIG. 3A is a schematic diagram of a video projection process according to an exemplary embodiment of this application. The terminal may play the target video selected by a user of the terminal in the playing window in the first page of the first APP. As shown in FIG. 3A, the target video is "the second episode of the television drama XX" in FIG. 3A.

In step S202, the terminal sends a screen projection instruction to a target screen projection device to project the target video into the target screen projection device for playing in response to detecting a screen projection triggering event in accordance with a determination that a playing progress of the target video in the first page reaches a first progress.

The playing progress of the target video refers to a ratio of contents that have been played in the target video to all contents. The playing progress is 0% when the target video is not played. The playing progress is 100% when the target video is completely played. The playing progress is a numerical value between 0% and 100% when the target video is not completely played. For example, if play time for all the contents of the target video is 100 minutes, and the target video is currently stopped at the content of the $10^{th}$ minute, a current playing progress of the target video is 10/100=10%. In this embodiment, a value range of the first progress is [0%, 100%]. In an implementation, the terminal sends, in response to detecting a screen projection triggering event in accordance with a determination that a playing progress of the target video in the first page reaches a first progress, a screen projection instruction to a target screen projection device to project the target video into the target screen projection device for playing in a manner that the target video continues to be played in a second page of the target screen projection device from the first progress. The screen projection instruction contains a playing address of the target video (e.g., a uniform resource locator (URL) of a first video) and the first progress of the target video. The second page may be any page displayed on the target screen projection device. In an implementation, the target screen projection device may support various APPs to be installed and run. A target APP is any APP in the target screen projection device. The target APP may include multiple service pages. The second page is any service page in the target APP. In an implementation, the first APP may be in an association relationship with the target APP. The association relationship refers to that the first APP belongs to the same program developer as the target APP, the first APP corresponds to the same server as the target APP, the first APP and the target APP are different embodiments of the same APP in different devices, etc. The screen projection triggering event refers to an event for triggering a video projection process. The screen projection triggering event may include an event making the first APP in an inactive state. The inactive state refers to that state that the first APP in the terminal runs in background in the terminal, or a state that the first APP in the terminal is terminated, or a state that the first APP in the terminal is interrupted. The screen projection triggering event may be, for example, an event generated by tapping a screen projection control in the terminal, an event generated by shaking the terminal, an event generated by rotating the terminal, or an event generated by switching from the first APP in the terminal to another APP in the terminal.

Figure 3B:
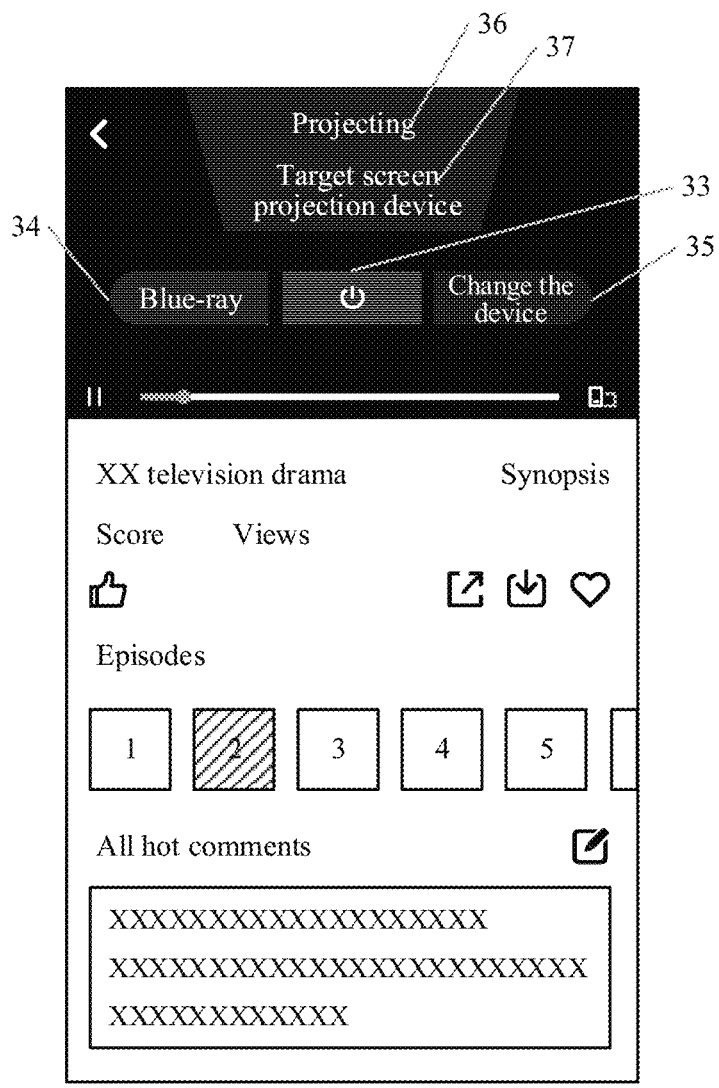
FIG. 3B is a schematic diagram of an interface for projection prompting information according to an exemplary embodiment of this application.

In an implementation, the terminal may also display projection prompting information in the playing window in the first page in accordance with a determination that the first APP is switched from the inactive state back to an active state by triggering the first APP (for example, tapping an icon of the first APP) during the playing of the target video in the target screen projection device. The projection prompting information is used for prompting the target video to continue to be played in the target screen projection device from the first progress. The active state refers to that the first APP in the terminal is kept in a state of running in foreground in the terminal. Referring to FIG. 3B, FIG. 3B is a schematic diagram of an interface for projection prompting information according to an exemplary embodiment of this application. The projection prompting information may include a video projection stopping identifier (e.g., a video projection stopping identifier 33 shown in FIG. 3B), a definition control option (e.g., a definition control option 34 shown in FIG. 3B), a screen projection device switching option (e.g., a screen projection device switching option 35 shown in FIG. 3B), a projection state of the target video (e.g., a projection state 36 "projecting" of the target video shown in FIG. 3B, a device identifier of screen projection device (e.g., a device identifier 37 "target screen projection device" of the target screen projection device shown in FIG. 3B), etc. The video projection stopping identifier may be used for generating a screen projection stopping triggering event. For example, when the video projection stopping identifier 33 shown in FIG. 3B is selected, the terminal generates a screen projection stopping triggering event capable of triggering a flow that the terminal continues to play the target video. The video/image definition control option may be used for switching a video definition during the playing of the target video. For example, a video definition during the playing of the target video in the target screen projection device may be switched from "standard definition" to "high definition", or from "high definition" to "super definition", etc., through the definition control option 34 shown in FIG. 3B. The screen projection device switching option may be used for switching screen projection devices. For example, another screen projection device except the target screen projection device may be selected to project the target video through the screen projection device switching option 35 shown in FIG. 3B. The projection state of the target video may be used for indicating a projection state of the target video in the target screen projection device. The projection state may include, but is not limited to, "projecting", "connecting", "successfully connected", etc. "Projecting" represents that the target video has been successfully played in the target screen projection device. "Connecting" represents that the terminal is establishing a communication connection with the target screen projection device. "Successfully connected" represents that the terminal has established a communication connection with the target screen projection device successfully and the target video is about to be played in the target screen projection device. The device identifier of screen projection device may be used for indicating a screen projection device currently configured to project the target video, e.g., the "target screen projection device" shown in FIG. 3B.

In step S203, the target screen projection device continues to play the target video in a second page from the first progress in response to the screen projection instruction of the terminal.

In an implementation, the target screen projection device, after receiving the screen projection instruction sent by the terminal, acquires the target video according to the playing address of the target video in the screen projection instruction, and continues to play the target video in the second page of the target APP in the target screen projection device from the first progress in the screen projection instruction. Continuing to play refers to relay playing or continuous playing. That is, the target video is kept continuously played when the terminal and the target screen projection device are switched to play the target video. For example, if the first progress indicates that the target video is stopped in the terminal at the $10^{th}$ minute, the target screen projection device continues to play the target video from the $10^{th}$ minute when the target video is projected into the target screen projection device for playing. Continuing to play ensures the playing continuity of the target video during projection, thereby ensuring a relatively good playing effect of the target video.

In step S204, the target screen projection device sends a playing progress of the target video to the terminal during the playing of the target video in the target screen projection device.

In step S205, the terminal records the playing progress of the target video.

Figure 3C:
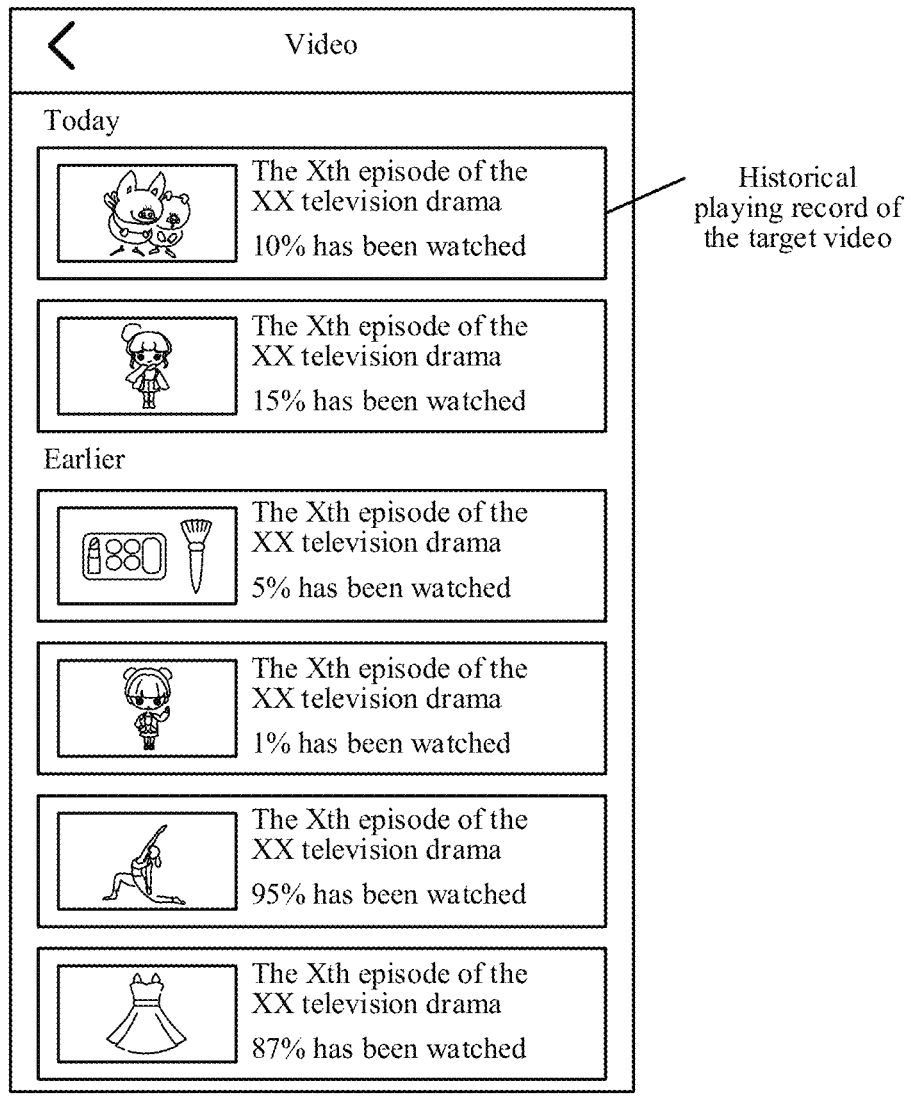
FIG. 3C is a schematic diagram of a playing history page according to an exemplary embodiment of this application.

In steps S204 to S205, the target screen projection device may synchronize the playing progress of the target video to the terminal in real time during the playing of the target video in the target screen projection device, and the terminal may record the playing progress of the target video in a playing history page. The playing history page may include multiple historical playing records, each of which includes a playing progress of a video related to the historical playing record. As shown in FIG. 3C, FIG. 3C is a schematic diagram of a playing history page according to an exemplary embodiment of this application. A historical playing record related to the target video is displayed in the playing history page. The historical playing record of the target video includes a playing progress of the target video. The playing progress of the target video refers to a fused progress of the playing progress of the target video in the first page and the playing progress of the target video in the target screen projection device. During specific implementation, the terminal and the target screen projection device may be switched for (e.g., back and forth) many times to play the target video. The playing progress of the target video refers to a progress after the playing progresses in the terminal and the target screen projection device are synchronized and fused (e.g., combined). For example, if the playing progress of the target video in the first page of the terminal is 10%, and the playing progress after the target screen projection device continues to play is 30%, the fused progress is 30%, and the fused progress 30% is displayed in the playing history page as a historical playing record of the target video.

In step S206, the terminal sends a screen projection stopping instruction to the target screen projection device in response to detecting a screen projection stopping triggering event in accordance with a determination that the playing progress of the target video in the target screen projection device reaches a second progress.

In an implementation, the terminal sends a screen projection stopping instruction to the target screen projection device in response to detecting a screen projection stopping triggering event in accordance with a determination that the playing progress of the target video in the target screen projection device reaches a second progress. The screen projection stopping triggering event refers to an event for triggering a video projection stopping process. The screen projection stopping triggering event may include an event making the first APP in the active state. The screen projection stopping triggering event may be, for example, an event generated by tapping the screen projection control in the terminal, an event generated by tapping the video projection stopping identifier 33 in FIG. 3B, an event generated by shaking the terminal, an event generated by rotating the terminal, or an event generated by switching from another APP in the terminal back to the first APP.

In step S207, the target screen projection device returns the target video to the terminal for playing in response to the screen projection stopping instruction of the terminal.

In step S208, the terminal continues to play the target video in the first page from the second progress.

In steps S207 to S208, the target screen projection device synchronizes the second progress reached during the playing of the target video in the second page to the terminal in response to the screen projection stopping instruction sent by the terminal, and the terminal continues to play the target video in the playing window in the first page from the second progress.

In this embodiment of this application, the terminal sends the screen projection instruction to the target screen projection device to project the target video into the target screen projection device for playing in response to detecting the screen projection triggering event in accordance with a determination that the playing progress of the target video in the first page of the terminal reaches the first progress. The target screen projection device continues to play the target video in the second page from the first progress in response to the screen projection instruction sent by the terminal. The terminal sends the screen projection stopping instruction to the target screen projection device in response to detecting the screen projection stopping triggering event in accordance with a determination that the playing progress of the target video in the target screen projection device reaches the second progress. The target screen projection device responds to the screen projection stopping instruction of the terminal, and the terminal continues to play the target video in the first page from the second progress. According to this embodiment of this application, the terminal and the target screen projection device may be switched flexibly to play the target video through the screen projection triggering event and the screen projection stopping triggering event, so as to meet a video projection requirement. In addition, the screen projection triggering event includes an event making the first APP in the inactive state, and the screen projection stopping triggering event includes an event making the first APP in the active state. The playing progress may still be synchronized between the terminal and the target screen projection device if the first APP of the terminal is in the inactive state, to continue to play the target video respectively. Therefore, a screen projection playing effect of the video is improved effectively.

It can be understood that the video projection system described in this embodiment of this application is for describing technical solutions of the embodiments of this application more clearly and does not form limits to the technical solutions provided in the embodiments of this application. It is to be understood by a person of ordinary skill in the art that, with the evolution of the system architecture and the emerging of new service scenarios, the technical solutions provided in the embodiments of this application are applied equally to similar technical problems.

Figure 4:
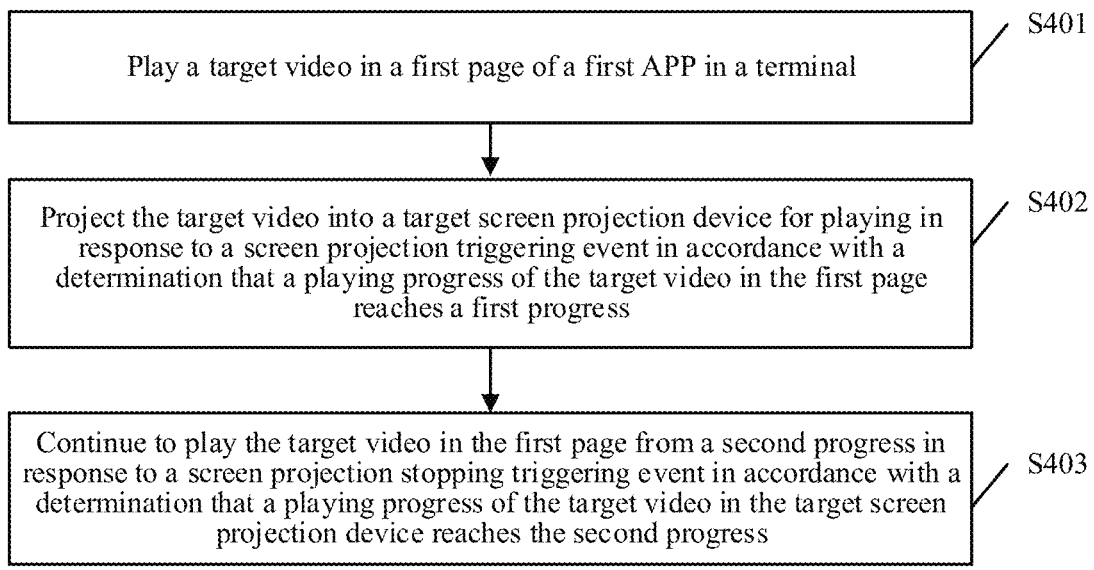
FIG. 4 is a schematic flowchart of a video projection method according to an exemplary embodiment of this application.

Based on the above descriptions, referring to FIG. 4, FIG. 4 is a schematic flowchart of a video projection method according to an exemplary embodiment of this application. The method may be performed by the terminal 101 in the embodiment shown in FIG. 1. The video projection method includes the following steps S401 to S403:

Step S401: Play a target video in a first page of a first APP in the terminal.

Step S402: Project the target video into a target screen projection device for playing in response to detecting a screen projection triggering event in accordance with a determination that a playing progress of the target video in the first page reaches a first progress.

Figure 5A:
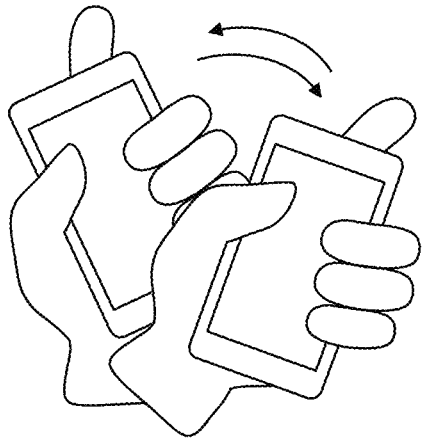
FIG. 5A is a schematic diagram of a shaking operation according to an exemplary embodiment of this application.
Figure 5B:
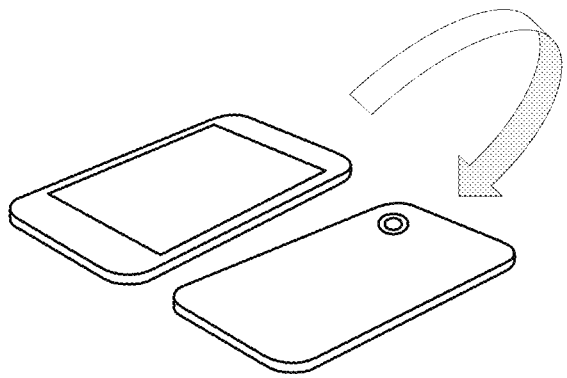
FIG. 5B is a schematic diagram of a rotation operation according to an exemplary embodiment of this application.

In an implementation, the screen projection triggering event may include an event making the first APP in an inactive state. The event making the first APP in the inactive state may include, but is not limited to, at least one of the following:

(1) An event that the terminal detects a gravity sensing operation: a screen projection triggering event is generated in accordance with a determination that the terminal detects the gravity sensing operation to make the first APP enter the inactive state during the playing of the target video in the first page of the first APP. In some embodiments, the gravity sensing operation interrupts a running process of the first APP, thereby influencing an activity of the first APP and making the first APP enter the inactive state. In some embodiments, the gravity sensing operation includes at least one of a shaking operation on the terminal or a rotation operation on the terminal. FIG. 5A is a schematic diagram of a shaking operation according to an exemplary embodiment of this application. As shown in FIG. 5A, a user of the terminal may shake the terminal to make the first APP enter the inactive state, thereby generating a screen projection triggering event. FIG. 5B is a schematic diagram of a rotation operation according to an exemplary embodiment of this application. As shown in FIG. 5B, the user of the terminal may rotate the terminal to make the first APP enter the inactive state, thereby generating a screen projection triggering event.

Figure 5C:
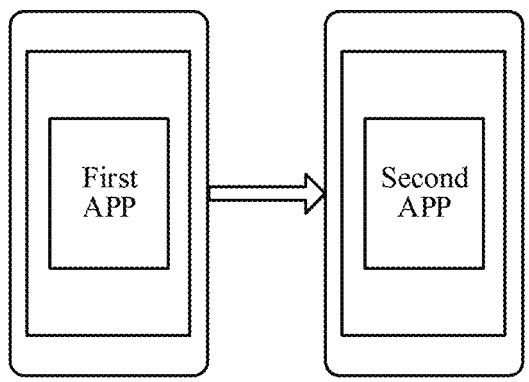
FIG. 5C is a schematic diagram of an APP switching operation according to an exemplary embodiment of this application.

(2) An event that the terminal switches the first APP: a screen projection triggering event is generated in accordance with a determination that the terminal switches from the first APP to another APP (e.g., a second APP) in the terminal to make the first APP enter the inactive state during the playing of the target video in the first page of the first APP. After the terminal switches from the first APP to the second APP, the second APP runs in foreground in the terminal, and the first APP runs in background in the terminal. Therefore, the first APP enters the inactive state. The first APP is any APP in the terminal, and the second APP is any APP in the terminal except the first APP. FIG. 5C is a schematic diagram of an APP switching operation according to an exemplary embodiment of this application. As shown in FIG. 5C, the user of the terminal may switch from the first APP to the second APP to make the first APP enter the inactive state, thereby generating a screen projection triggering event.

(3) An event that the terminal switches the first APP from foreground running to background running: a screen projection triggering event is generated in accordance with a determination that the first APP is switched from foreground running to background running so as to enter the inactive state during the playing of the target video in the first page of the first APP. For example, if the terminal switches from the first APP to a main menu page of the terminal, the first APP runs in background in the terminal, and the first APP enters the inactive state. Therefore, a screen projection triggering event is generated.

Figure 5D:
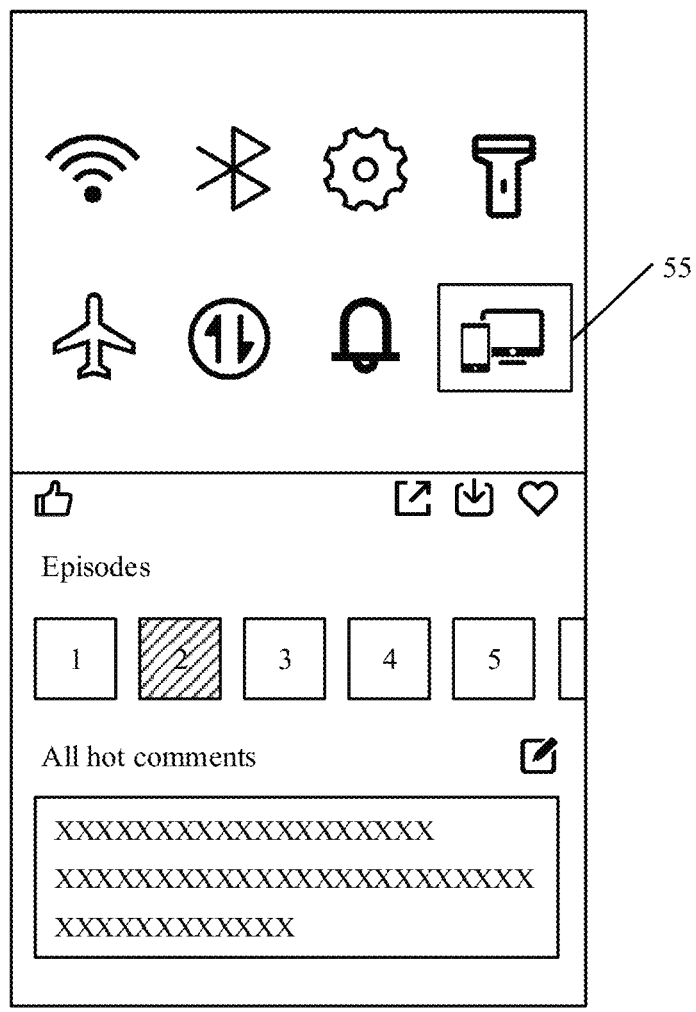
FIG. 5D is a schematic diagram of a screen projection control according to an exemplary embodiment of this application.

(4) An event of selecting a screen projection control set in the terminal: the screen projection control refers to a control beyond a service scope of the first APP. The first APP includes multiple service pages, each of which corresponds to a service scope. The service scope of the first APP includes the service scope corresponding to each service page of the first APP. That the screen projection control is beyond the service scope of the first APP refers to that the screen projection control is not in any service page of the first APP. FIG. 5D is a schematic diagram of a screen projection control according to an exemplary embodiment of this application. As shown in FIG. 5D, the screen projection control may be a hardware screen projection control 55 set in the terminal. The hardware screen projection control 55 is not in any service page of the first APP. A screen projection triggering event is generated in accordance with a determination that the screen projection control is triggered (for example, the screen projection control is tapped by the user of the terminal) to make the first APP enter the inactive state during the playing of the target video in the first page of the first APP. The screen projection control is triggered to interrupt the running process of the first APP during the playing of the target video in the first page of the first APP, thereby influencing the activity of the first APP and making the first APP enter the inactive state.

Figure 5E:
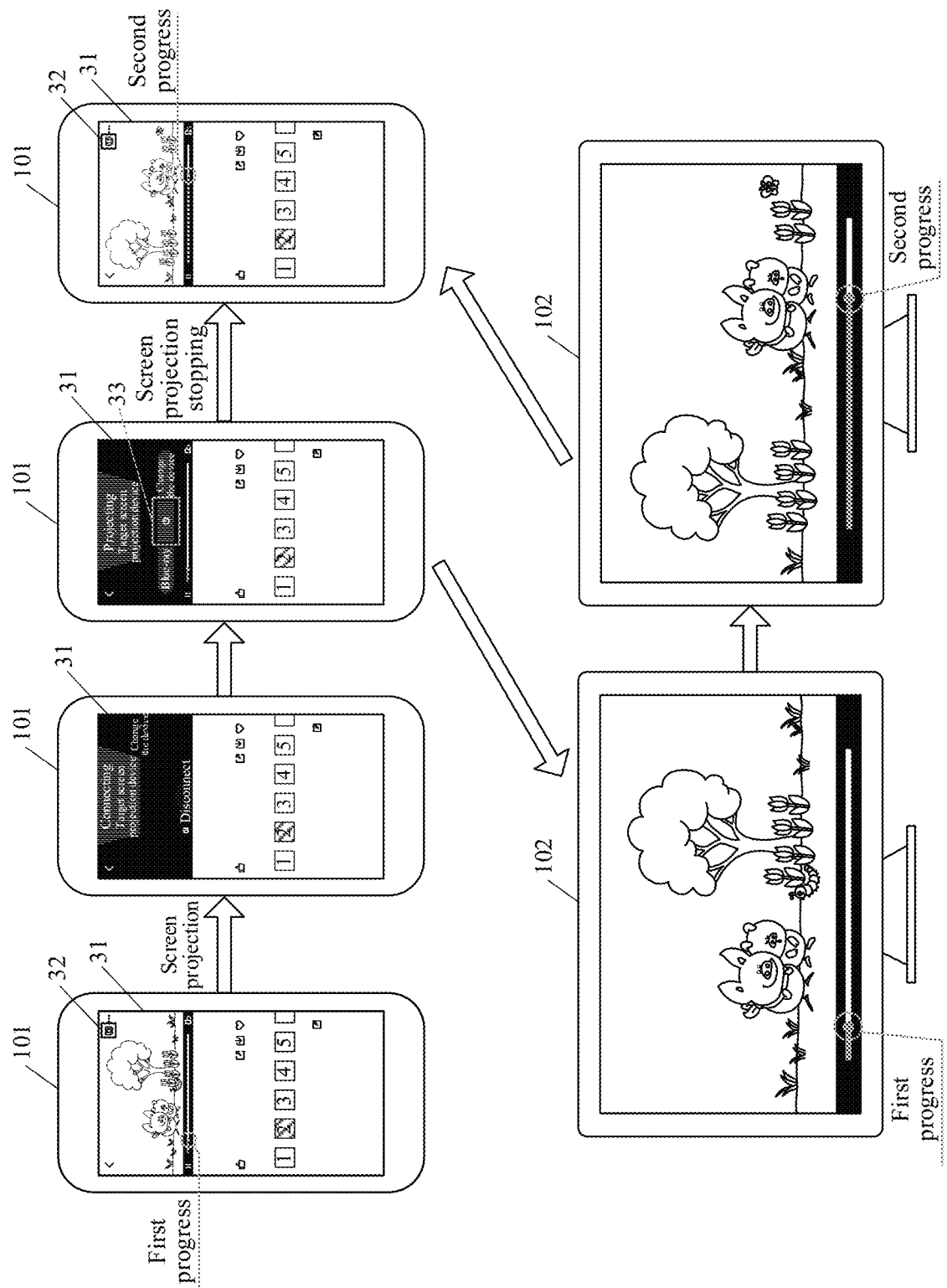
FIG. 5E is a schematic diagram of a video projection process according to another exemplary embodiment of this application.

In an implementation, the screen projection triggering event may further include an event keeping the first APP in an active state. Keeping in the active state refers to that the first APP in the terminal is kept in a state of running in foreground in the terminal. FIG. 5E is a schematic diagram of a video projection process according to another exemplary embodiment of this application. As shown in FIG. 5E, a video projection control 32 is displayed in a playing window in the first page of the first APP in the terminal. The event keeping the first APP in the active state includes an event of selecting the video projection control. When the video projection control is triggered (for example, the video projection control is tapped by the user of the terminal), the terminal displays projection prompting information in the playing window, and the first APP continues to be run in foreground in the terminal, and is kept in the active state. Therefore, a screen projection triggering event is generated.

Step S403: Continue to play the target video in the first page from a second progress in response to detecting a screen projection stopping triggering event in accordance with a determination that a playing progress of the target video in the target screen projection device reaches the second progress.

In an implementation, the screen projection stopping triggering event may include an event making the first APP in an active state. The event making the first APP in the active state may include, but is not limited to, at least one of the following:

(1) An event that the terminal detects a gravity sensing operation: a screen projection stopping triggering event is generated in accordance with a determination that the terminal detects the gravity sensing operation to make the first APP enter the active state during the playing of the target video in the target screen projection device. The gravity sensing operation makes the interrupted first APP run again in foreground in the terminal to make the first APP enter the active state. Therefore, a screen projection stopping triggering event is generated. The gravity sensing operation includes at least one of a shaking operation and a rotation operation.

(2) An event that the terminal switches the first APP back: a screen projection stopping triggering event is generated in accordance with a determination that the terminal switches from the other APP (e.g., the second APP) in the terminal to the first APP to make the first APP enter the active state during the playing of the target video in the target screen projection device. After the terminal switches from the second APP to the first APP, the second APP runs in background in the terminal, and the first APP runs in foreground in the terminal. Therefore, the first APP enters the active state. The first APP is any APP in the terminal, and the second APP is any APP in the terminal except the first APP. The terminal switches from the second APP to a third APP after switching from the first APP to the second APP to generate a screen projection triggering event. The terminal may generate a screen projection stopping triggering event in accordance with a determination of switching from the third APP to the first APP. The third APP is any APP in the terminal except the first APP and the second APP.

(3) An event that the terminal switches the first APP from the background running to the foreground running: a screen projection stopping triggering event is generated in accordance with a determination that the first APP is switched from the background running to the foreground running so as to enter the active state during the playing of the target video in the target screen projection device. For example, if the terminal switches from the main menu page of the terminal to a service page of the first APP, the first APP runs in foreground in the terminal, and the first APP enters the active state. Therefore, a screen projection stopping triggering event is generated.

(4) An event of selecting the screen projection control set in the terminal: a screen projection stopping triggering event is generated in accordance with a determination that the screen projection control is triggered (for example, the screen projection control 55 shown in FIG. 5E is tapped by the user of the terminal) to make the first APP enter the active state during the playing of the target video in the target screen projection device. The screen projection control is triggered during the playing of the target video in the target screen projection device, so that the interrupted first APP runs again in foreground in the terminal, and the first APP enters the active state. Therefore, a screen projection stopping triggering event is generated.

In an implementation, after the video projection control in the first page of the terminal is triggered to generate the screen projection triggering event, the target video continues to be played in a second page of a target APP in the target screen projection device, and projection prompting information is displayed in a playing window in the first page of the terminal. The projection prompting information includes a video projection stopping control (e.g., the video projection stopping control 33 shown in FIGS. 3B and 5E). A screen projection stopping triggering event may be generated in accordance with a determination that the video projection stopping control is triggered (e.g., the video projection stopping control is tapped by the user of the terminal) during the playing of the target video in the target screen projection device.

Each of the above-mentioned screen projection triggering events and screen projection stopping triggering events is an example, and there may be other cases. For example, a screen projection stopping triggering event may be generated in response to that the target screen projection device is turned off in accordance with a determination that the playing progress of the target video in the target screen projection device reaches the second progress. In addition, various screen projection triggering events and various screen projection stopping triggering events may be combined flexibly for use. For example, when a screen projection triggering event is generated by tapping the screen projection control, a screen projection stopping triggering event may be generated not necessarily by tapping the screen projection control again but by performing a gravity sensing operation by the terminal. No limits are made thereto in this embodiment of this application.

Figure 5F:
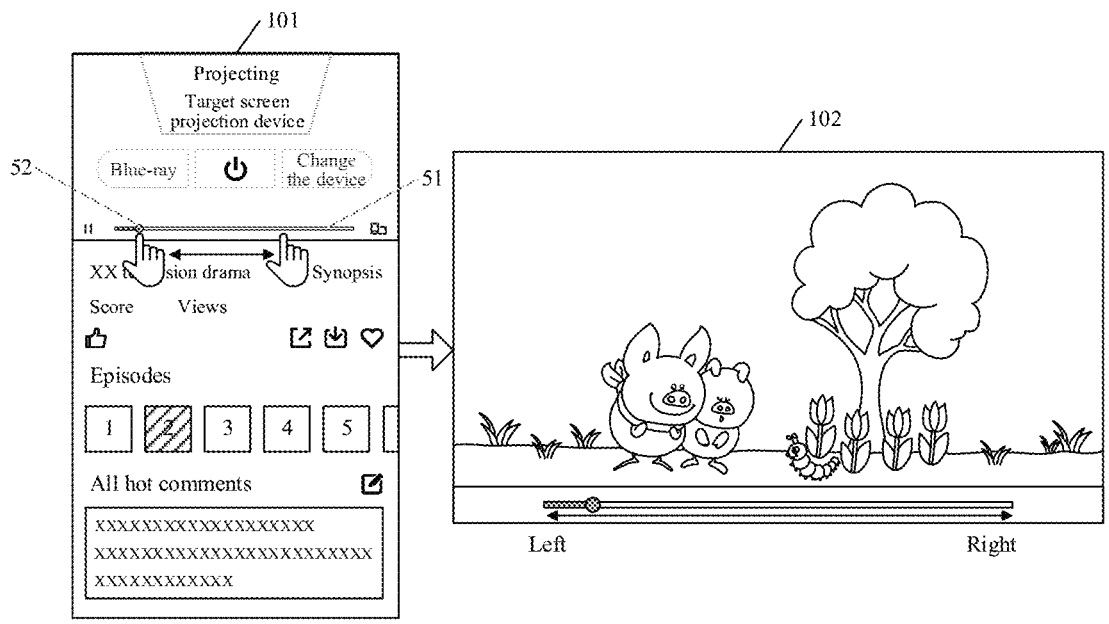
FIG. 5F is a schematic diagram of a playing progress control operation according to an exemplary embodiment of this application.

In an implementation, FIG. 5F is a schematic diagram of a playing progress control operation according to an exemplary embodiment of this application. As shown in FIG. 5F, the playing window in the first page of the terminal may include a progress indication axis (e.g., a progress indication axis 51 shown in FIG. 5F). A progress pointer (e.g., a progress pointer 52 shown in FIG. 5F) is set in the progress indication axis. The progress pointer moves along the progress indication axis with the changing of the playing progress of the target video. The playing progress of the target video in the target screen projection device changes with the movement of the progress pointer in accordance with a determination that the progress pointer is subjected to a dragging operation to move along the progress indication axis during the playing of the target video in the target screen projection device. As shown in FIG. 5F, when the progress pointer in the terminal is dragged leftwards along the progress indication axis, the target video is backward in the target screen projection device, and a value of the playing progress decreases. When the progress pointer in the terminal is dragged rightwards along the progress indication axis, the target video is forward in the target screen projection device, and the value of the playing progress increases.

Figure 5G:
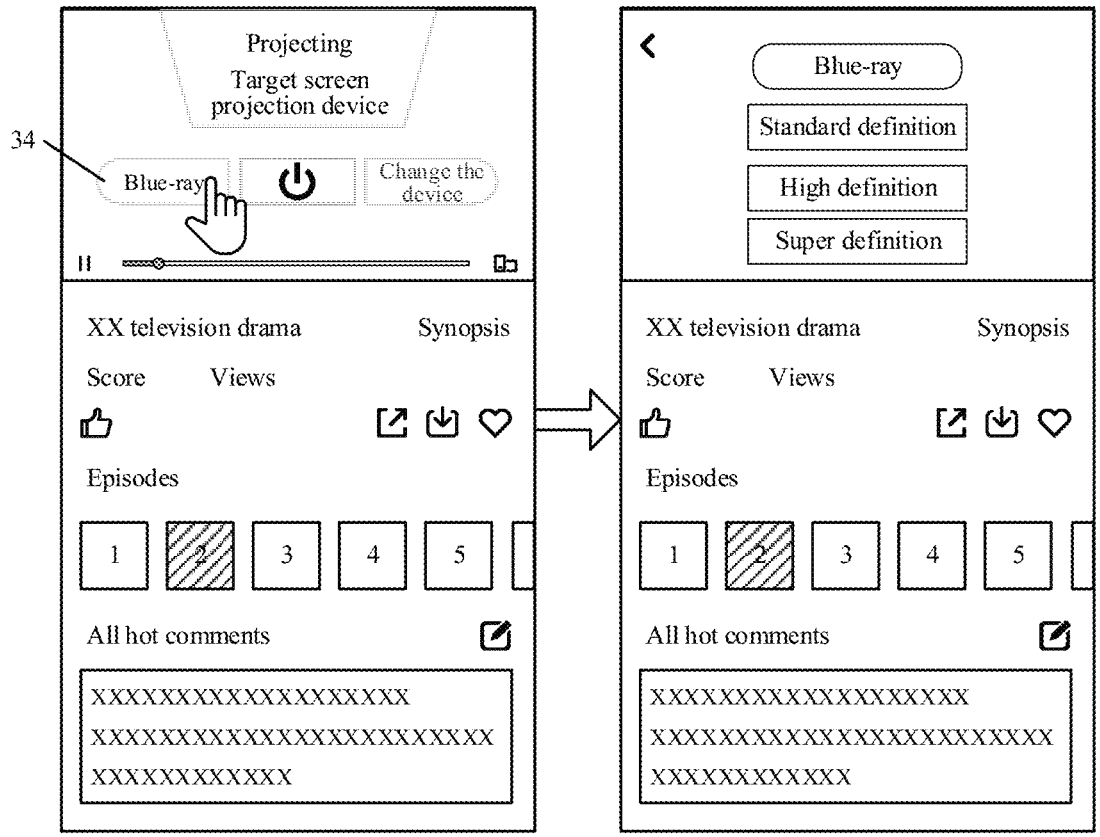
FIG. 5G is a schematic diagram of a definition control operation according to an exemplary embodiment of this application.

In an implementation, projection prompting information is displayed in the first page of the terminal. The projection prompting information may further include a definition control option (e.g., the definition control option 34 shown in FIG. 3B). FIG. 5G is a schematic diagram of a definition control operation according to an exemplary embodiment of this application. As shown in FIG. 5G, a definition list is displayed in accordance with a determination that the definition control option is selected. The definition list includes at least one definition identifier (e.g., "blue-ray" and "standard definition" shown in FIG. 5G). A first definition identifier (e.g., "blue-ray" shown in FIG. 5G) corresponding to a playing definition of the target video in the target screen projection device is highlighted in the definition list. Highlighting may include displaying a device identifier of the target screen projection device at a key position in the definition list, the key position including a top position, a bottom position, and any position between the top position and the bottom position, or, displaying the first definition identifier in the definition list in a first color and another definition identifier in the definition list in a second color. The playing definition of the target video in the target screen projection device is switched from a first definition to a second definition in accordance with a determination that a second definition identifier (e.g., "high definition" shown in FIG. 5G) in the definition list is selected. The first definition identifier is a definition identifier in the definition list. The second definition identifier is any definition identifier in the definition list except the first definition identifier. It can be understood that the first definition identifier is highlighted in the definition list for a purpose of indicating that a current playing definition of the target video in the target screen projection device is the first definition. Therefore, after switching to the second definition, the first definition identifier is not highlighted any more in the definition list, and instead, the second definition identifier that the playing definition is switched to is highlighted in the definition list to indicate that the current playing definition of the target video in the target screen projection device changes to the second definition.

In an implementation, the playing window in the first page of the terminal includes an attribute control region. Alternatively, the terminal includes an attribute control button. An attribute indication identifier is displayed in the playing window in response to a control operation acting on the attribute control region or the attribute control button during the playing of the target video in the playing window. The attribute indication identifier is used for indicating an attribute value. A playing attribute of the target video in the target screen projection device is controlled by the attribute value indicated by the attribute indication identifier. The attribute indication identifier includes at least one of a volume indication identifier and a brightness indication identifier.

Figure 5H:
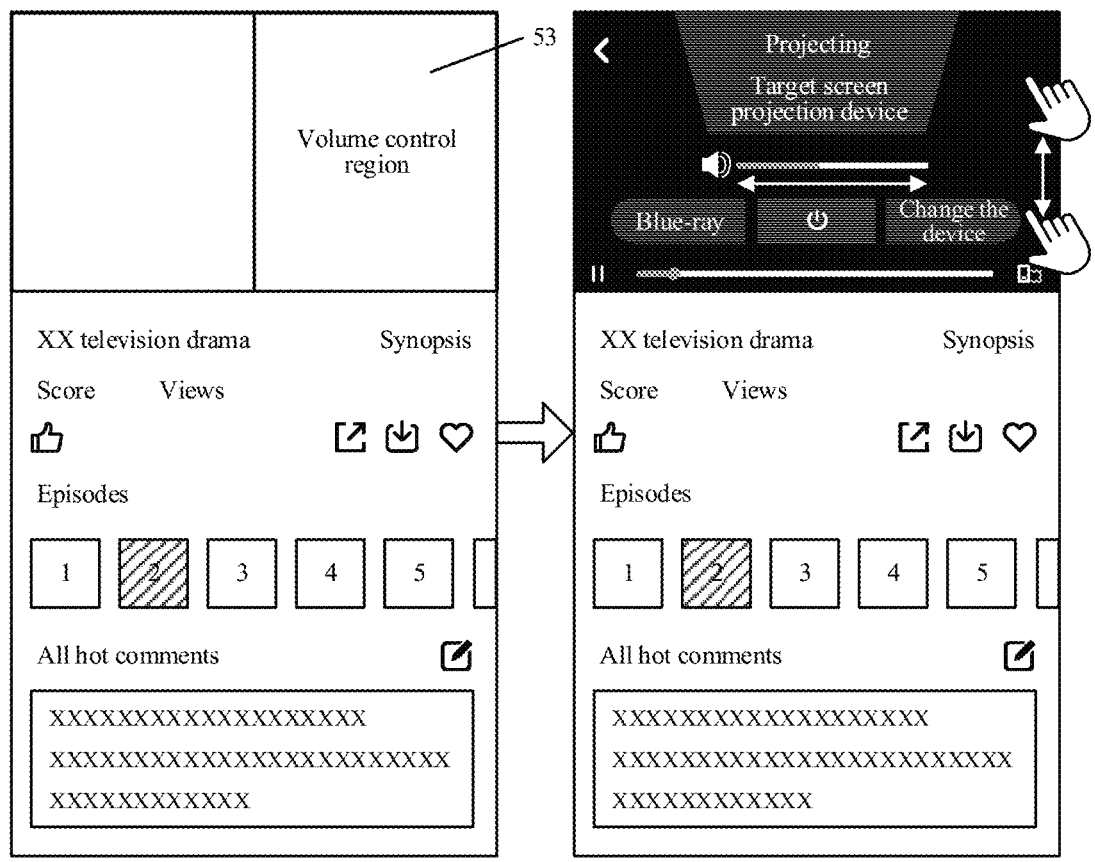
FIG. 5H is a schematic diagram of a volume control operation according to an exemplary embodiment of this application.

For example, FIG. 5H is a schematic diagram of a volume control operation according to an exemplary embodiment of this application. Referring to FIG. 5H, the playing window in the first page of the terminal includes a volume control region 53. Alternatively, the terminal includes a volume control button (e.g., a volume control button in a mobile phone). A volume indication identifier (e.g., a speaker identifier and sound indication axis shown in FIG. 5H) is displayed in the playing window in response to a control operation acting on the volume control region (e.g., an upward/downward slide performed by the user of the terminal in the volume control region in FIG. 5H) or a control operation acting on the volume control button (e.g., the user terminal presses the volume control button of the terminal) during the playing of the target video in the playing window. The volume indication identifier is used for indicating a volume value. A volume of the target video in the target screen projection device is controlled by the volume value indicated by the sound indication axis in the volume indication identifier.

Figure 5I:
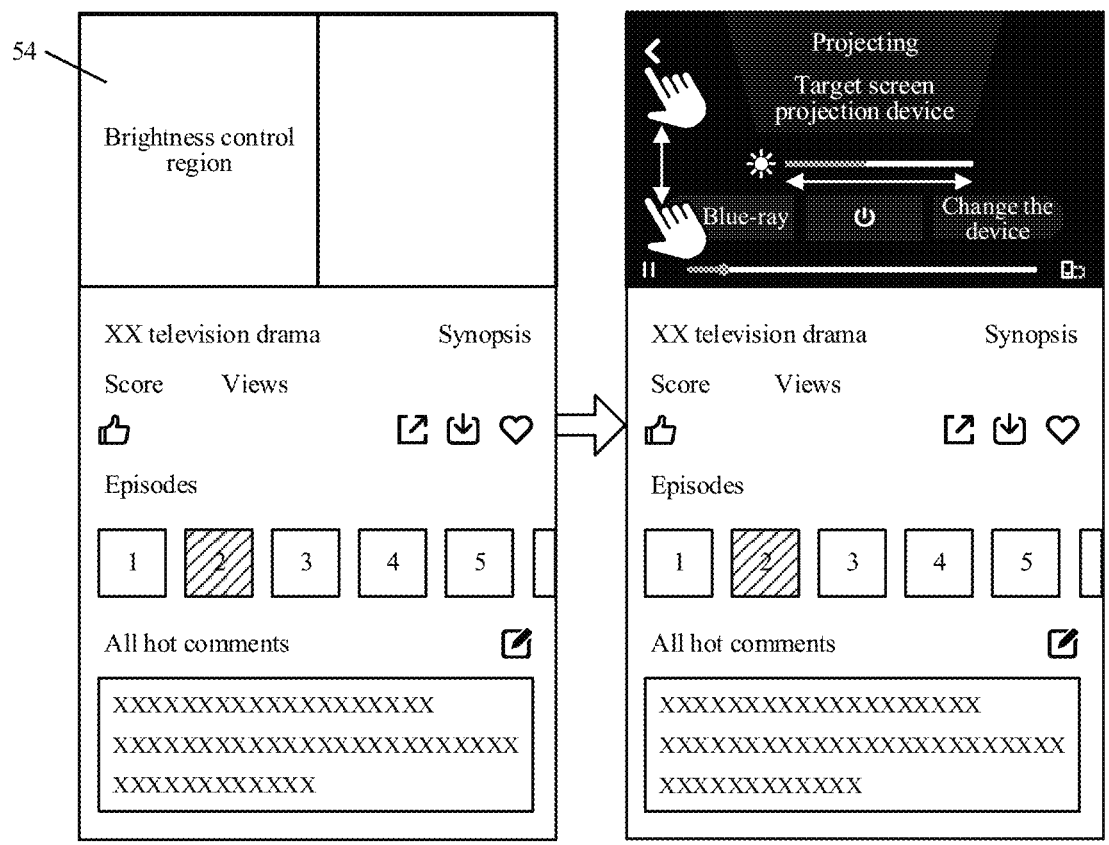
FIG. 5I is a schematic diagram of a brightness control operation according to an exemplary embodiment of this application.

FIG. 5I is a schematic diagram of a brightness control operation according to an exemplary embodiment of this application. Referring to FIG. 5I, the playing window in the first page of the terminal includes a brightness control region 54. A brightness indication identifier (e.g., a sun identifier and brightness indication axis shown in FIG. 5I) is displayed in the playing window in response to a control operation acting on the brightness control region (e.g., an upward/downward slide performed by the user of the terminal in the brightness control region in FIG. 5O during the playing of the target video in the playing window. The brightness indication identifier is used for indicating a brightness value.

Brightness of the target video in the target screen projection device is controlled by the brightness value indicated by the brightness indication axis in the brightness indication identifier.

Figure 5J:
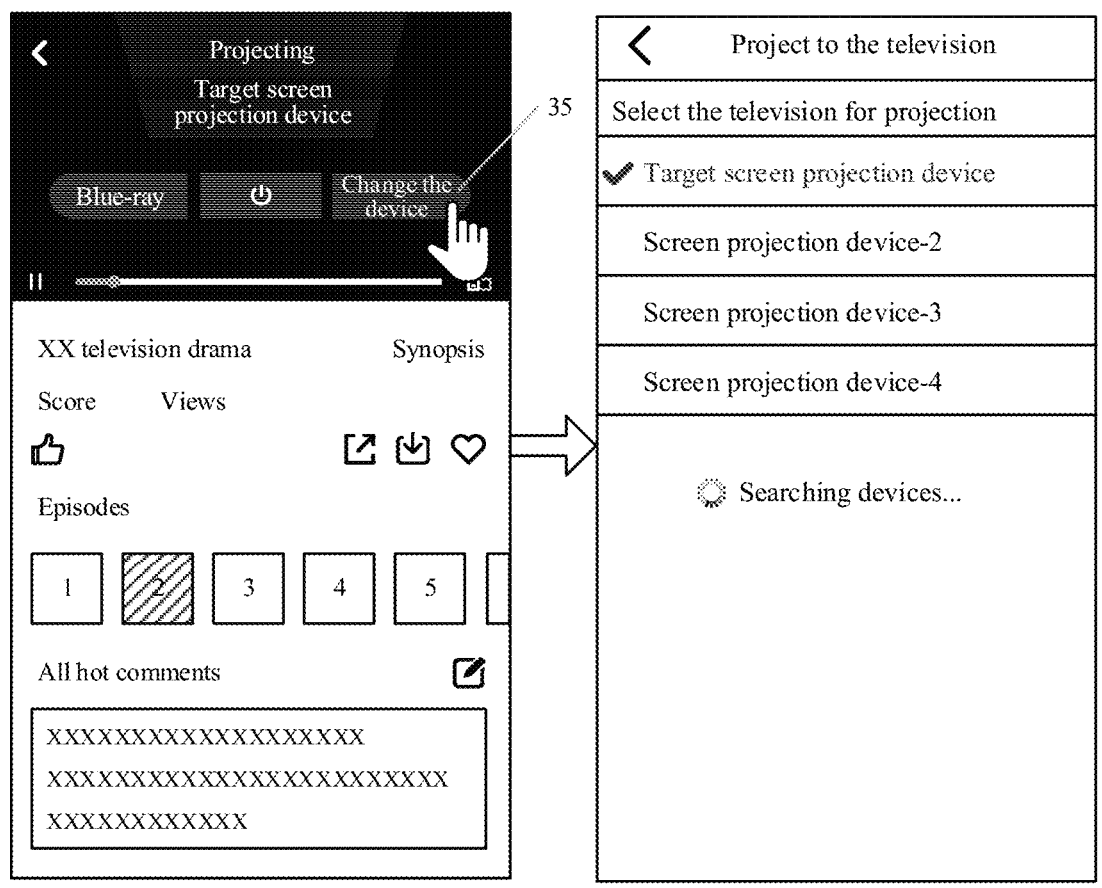
FIG. 5J is a schematic diagram of a screen projection device switching operation according to an exemplary embodiment of this application.

In an implementation, projection prompting information is displayed in the first page of the terminal. The projection prompting information may further include a screen projection device switching option (e.g., the screen projection device switching option 35 shown in FIG. 3B). FIG. 5J is a schematic diagram of a screen projection device switching operation according to an exemplary embodiment of this application. As shown in FIG. 5J, a screen projection device selection page (e.g., a "project to the television" page shown in FIG. 5J) is displayed in accordance with a determination that the screen projection device switching option is selected. A device identifier of at least one screen projection device (e.g., "target screen projection device", "screen projection device-2", and other device identifiers in the screen projection device selection page) is displayed in the screen projection device selection page. The target video continues to be played in another screen projection device from a playing progress recorded in a historical playing record in accordance with a determination that a device identifier (e.g., "screen projection device-2" in the screen projection device selection page) of the other screen projection device in the screen projection device selection page except the target screen projection device is selected. A priority of the target screen projection device is higher than that of the other screen projection device. A device identifier of the target screen projection device is displayed in the screen projection device selection page in a different manner. The displaying in a different manner may include displaying the device identifier of the target screen projection device at a key position in the screen projection device selection page, the key position including a top position, a bottom position, and any position between the top position and the bottom position, or, displaying the device identifier of the target screen projection device in the screen projection device selection page in a first color and the device identifier of the other screen projection device in the screen projection device selection page in a second color, or, synchronously displaying a priority label (e.g., a gray tick shown in FIG. 5J) in a display row of the device identifier of the target screen projection device. In this embodiment, the priority of the target screen projection device is set to be higher than that of the other screen projection device, so that automatic screen projection may be implemented. That is, the terminal, in response to detecting the screen projection triggering event, may select the target screen projection device to project the target video rapidly according to a sequence from high to low priorities. Therefore, the video projection efficiency may be improved effectively.

Figure 5K:
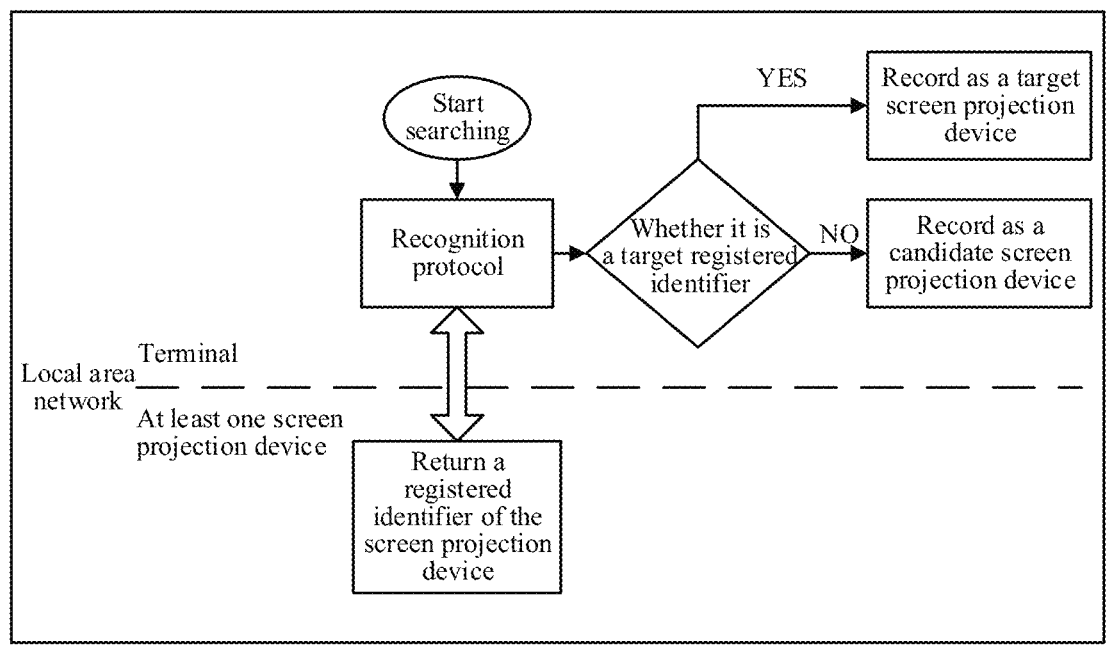
FIG. 5K is a schematic flowchart of detecting a screen projection device according to an exemplary embodiment of this application.
Figure 5L:
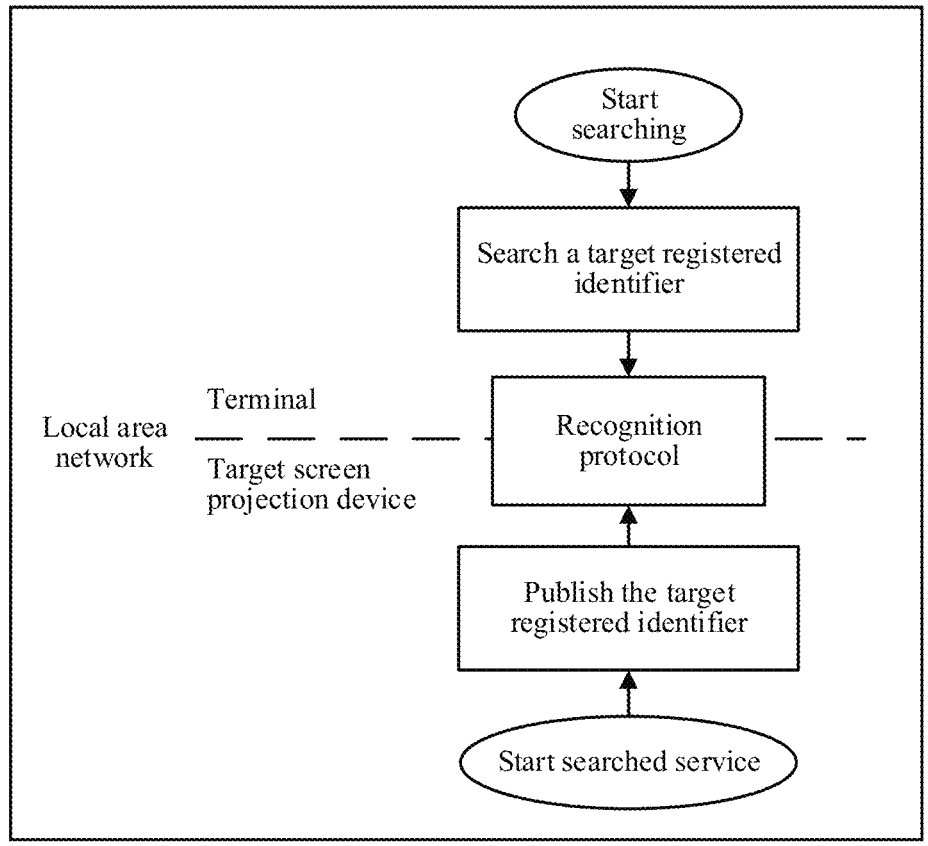
FIG. 5L is a schematic flowchart of detecting a screen projection device according to another exemplary embodiment of this application.

Referring to FIGS. 5K and 5L, FIG. 5K is a schematic flowchart of detecting a screen projection device according to an exemplary embodiment of this application. FIG. 5L is a schematic flowchart of detecting a screen projection device according to another exemplary embodiment of this application. Taking the establishment of a communication connection between the terminal and each screen projection device through local area networks as an example, the terminal may detect the screen projection devices in the same local area network to determine the target screen projection device after the first APP in the terminal is started. A specific detection process may include the following operations. First, each screen projection device broadcasts its own registered identifier in the local area network. The registered identifier refers to an identifier used for uniquely identifying each screen projection device when each screen projection device is registered successfully in the local area network. The registered identifier may include, but is not limited to, a domain name, name, etc., of each screen projection device. Second, the terminal recognizes whether the registered identifier of each screen projection device includes a target registered identifier through a recognition protocol. In an implementation, the target registered identifier refers to a registered identifier including a target character, and the target character may be a special character on which the terminal and each screen projection device reach an agreement. For example, if the registered identifier is the domain name of the screen projection device, the target character may be "_ktcp-remote.tcp.local". If the target registered identifier is included, the terminal determines the screen projection device identified by the target registered identifier as a target screen projection device.

If the terminal establishes a communication connection with each screen projection device through a local area network, the recognition protocol may be a multicast domain name system (mDNS) protocol for the local area network. If the terminal establishes a communication connection with each screen projection device through Wi-Fi, Bluetooth, P2P, or other near field communication modes, the recognition protocol may be an interaction protocol in the near field communication mode. If registered identifiers of multiple screen projection devices all include the target character, the terminal may randomly select one of the multiple screen projection devices as a target screen projection device, or determine the screen projection device in strongest signal connection with or geographically closest to the terminal in the multiple screen projection devices as a target screen projection device.

In this embodiment of this application, the terminal, in response to detecting the screen projection triggering event in accordance with a determination that the playing progress of the target video in the first page of the terminal reaches the first progress, projects the target video into the target screen projection device for playing in a manner that the target video continues to be played in the second page of the target APP in the target screen projection device from the first progress, the terminal continues to play the target video in the first page from the second progress in response to detecting the screen projection stopping triggering event in accordance with a determination that the playing progress of the target video in the target screen projection device reaches the second progress. According to this embodiment of this application, the terminal and the target screen projection device may be switched flexibly to play the target video in a projection process through the screen projection triggering event and the screen projection stopping triggering event, so as to meet a video projection requirement. Meanwhile, the playing progress of the target video is synchronized in real time between the terminal and the target screen projection device when the first APP in the terminal is in the inactive state, which contributes to improving a screen projection playing effect of the video. In addition, the definition control option in the projection prompting information may further be triggered to control the playing definition of the target video in the target screen projection device, the screen projection device switching option in the projection prompting information may further be triggered to switch the screen projection devices, the playing progress of the target video in the target screen projection device may further be controlled through the progress pointer, and control operations may further be performed in the volume control region and the brightness control region to control the volume and brightness of the target video during playing in the target screen projection device, so that flexible and diverse screen projection control operations are provided to further meet the video projection requirement and improve the video projection effect.

Figure 6:
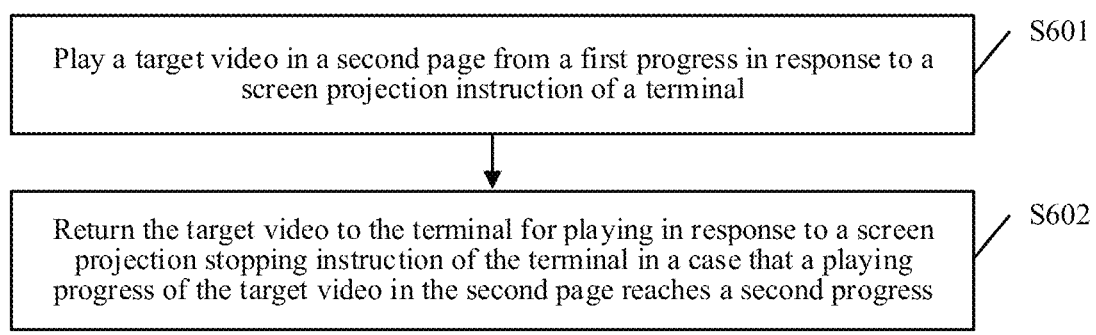
FIG. 6 is a schematic flowchart of a video projection method according to another exemplary embodiment of this application.

Referring to FIG. 6, FIG. 6 is a schematic flowchart of a video projection method according to an exemplary embodiment of this application. The method may be performed by the target screen projection device 102 in the embodiment shown in FIG. 1. The video projection method includes the following steps S601 to S602:

Step S601: Play a target video in a second page from a first progress in response to a screen projection instruction of a terminal.

In an implementation, the screen projection instruction is sent to the target screen projection device when a playing progress of the target video in a first page of the terminal reaches the first progress and a screen projection triggering event is detected. The screen projection instruction may contain a playing address of the target video and the first progress of the target video. The target screen projection device may play, in response to the screen projection instruction of the terminal, the target video in the second page from the first progress according to the playing address of the target video.

Step S602: Return the target video to the terminal for playing in response to a screen projection stopping instruction of the terminal in accordance with a determination that a playing progress of the target video in the second page reaches a second progress.

In an implementation, the terminal, in response to a screen projection stopping triggering event in accordance with a determination that a playing progress of the target video in the second page reaches a second progress, sends a screen projection stopping instruction to the target screen projection device. The target screen projection device, in response to the screen projection stopping instruction sent by the terminal, may return the target video to the terminal for playing in a manner that the target video continues to be played in a first page of the terminal from the second progress.

In an implementation, the target screen projection device may synchronize the playing progress of the target video to the terminal when the target screen projection device plays the target video in the second page. Synchronization modes may include, but are not limited to, the following two. First, if a first APP in the terminal is in an active state (for example, the first APP is in the active state when a video projection control in the first page is tapped to trigger screen projection) during the playing of the target video in the target screen projection device, the target screen projection device may synchronize the playing progress of the target video to the terminal in real time. Second, if the first APP in the terminal is in an inactive state during the playing of the target video in the target screen projection device, the target screen projection device may upload the playing progress of the target video to a server, and after the first APP in the terminal is switched from the inactive state to the active state, the terminal may acquire the playing progress of the target video from the server. The second mode may specifically refer to detailed descriptions in an embodiment shown in FIG. 7.

In this embodiment of this application, the terminal sends a screen projection instruction to the target screen projection device in response to detecting the screen projection triggering event in accordance with a determination that the playing progress of the target video in the first page of the terminal reaches the first progress. The target screen projection device continues to play the target video in the second page from the first progress in response to the screen projection instruction sent by the terminal. The terminal sends the screen projection stopping instruction to the target screen projection device in response to detecting the screen projection stopping triggering event in accordance with a determination that the playing progress of the target video in the target screen projection device reaches the second progress. The target screen projection device returns the target video to the terminal for playing in response to the screen projection stopping instruction of the terminal, and the terminal continues to play the target video in the first page from the second progress. According to this embodiment of this application, the terminal and the target screen projection device may be switched to continuously play the target video in a projection process through the screen projection triggering event and the screen projection stopping triggering event. Meanwhile, the playing progress of the target video is synchronized in real time between the terminal and the target screen projection device when the first APP in the terminal is in the inactive state, so that a screen projection playing effect of the video is improved.

Figure 7:
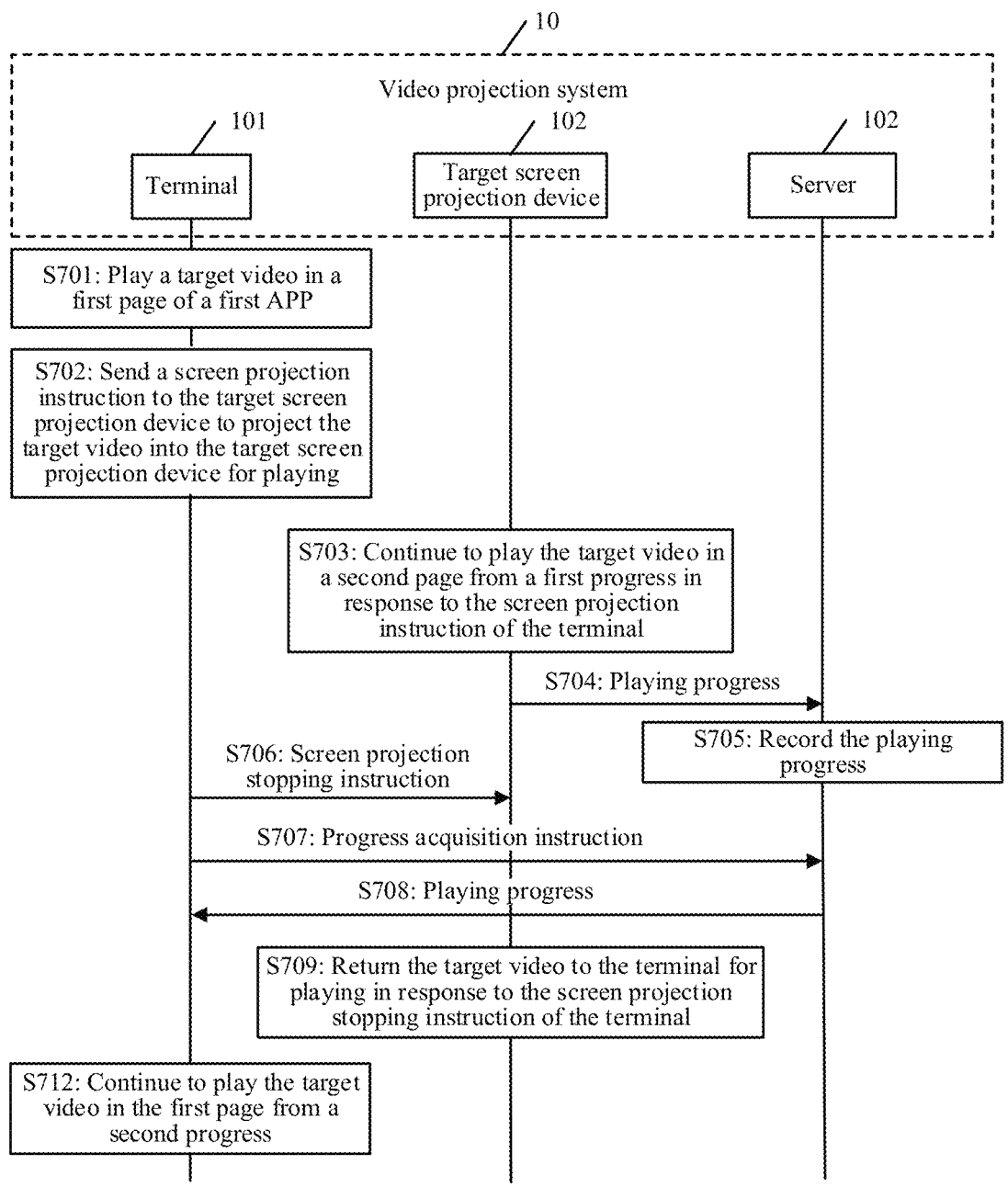
FIG. 7 is a schematic flowchart of a video projection method according to another exemplary embodiment of this application.

Referring to FIG. 7, FIG. 7 is a schematic flowchart of a video projection method according to an exemplary embodiment of this application. The method may be implemented interactively by the terminal 101 and target screen projection device 102 in the video projection system 10 shown in FIG. 1. In the video projection method shown in FIG. 7, the video projection system 10 may further include a server 103. The server 103 may be an independent physical server, or a server cluster or distributed system including multiple physical servers, or a cloud server providing cloud computing service. No limits are made thereto in this embodiment of this application. The video projection method may include the following steps S701 to S710:

In step S701, the terminal plays a target video in a first page of a first APP.

In step S702, the terminal sends a screen projection instruction to a target screen projection device to project the target video into the target screen projection device for playing in response to detecting a screen projection triggering event in accordance with a determination that a playing progress of the target video in the first page reaches a first progress.

In step S703, the target screen projection device continues to play the target video in a second page from the first progress in response to the screen projection instruction of the terminal.

In step S704, the target screen projection device sends a playing progress of the target video to the server during the playing of the target video in the target screen projection device.

In step S705, the server records the playing progress of the target video.

In step S706, the terminal sends a screen projection stopping instruction to the target screen projection device in response to detecting a screen projection stopping triggering event in accordance with a determination that the playing progress of the target video in the target screen projection device reaches a second progress.

In step S707, the terminal sends a progress acquisition instruction to the server.

Steps S706 and S707 may be performed in a random sequence. That is, S707 may be performed after S706, or S706 may be performed after S707, or S706 and S707 may be performed at the same time. No limits are made thereto in this embodiment of this application.

In step S708, the server sends the playing progress of the target video to the terminal.

In an implementation, during the playing of the target video in the target screen projection device, the first APP in the terminal is in an inactive state, and the terminal is incapable of establishing a communication connection with the target screen projection device. Therefore, the target screen projection device is incapable of synchronizing the playing progress of the target video to the terminal. In such case, the target screen projection device, with the help of the server, synchronizes the playing progress of the target video to the server for the server to record the playing progress of the target video. After the first APP in the terminal is switched from the inactive state to an active state, the terminal may send a progress acquisition instruction to the server, and then the server may return the playing progress unrecorded by the terminal to the terminal. As such, the playing progress of the target video may further be synchronized in real time between the terminal and the target screen projection device, to avoid the condition that the progress cannot be synchronized when the communication connection is interrupted.

In step S709, the target screen projection device returns the target video to the terminal for playing in response to the screen projection stopping instruction of the terminal.

In step S710, the terminal continues to play the target video in the first page from the second progress.

The execution process of each step in this embodiment of this application may refer to the descriptions in the above-mentioned embodiment, and will not be elaborated herein.

In this embodiment of this application, the terminal sends the screen projection instruction to the target screen projection device to project the target video into the target screen projection device for playing in response to detecting the screen projection triggering event in accordance with a determination that the playing progress of the target video in the first page of the terminal reaches the first progress. The target screen projection device continues to play the target video in the second page of a target APP from the first progress in response to the screen projection instruction sent by the terminal. The terminal sends the screen projection stopping instruction to the target screen projection device in response to detecting the screen projection stopping triggering event in accordance with a determination that the playing progress of the target video in the target screen projection device reaches the second progress. The target screen projection device returns the target video to the terminal for playing in response to the screen projection stopping instruction of the terminal. The terminal continues to play the target video in the first page from the second progress. According to this embodiment of this application, the terminal and the target screen projection device may be switched to continuously play the target video in a screen projection process through the screen projection triggering event and the screen projection stopping triggering event. Meanwhile, the playing progress of the target video is synchronized in real time between the terminal and the target screen projection device when the first APP in the terminal is in the inactive state, so that a screen projection playing effect of the video is improved. In addition, the playing progress of the target video is recorded by virtue of the server, so that the real-time synchronization of the playing progress of the target video between the terminal and the target screen projection device may further be ensured, and the condition that the playing progress cannot be synchronized when the communication connection between the terminal and the target screen projection device is interrupted may be avoided.

Figure 8:
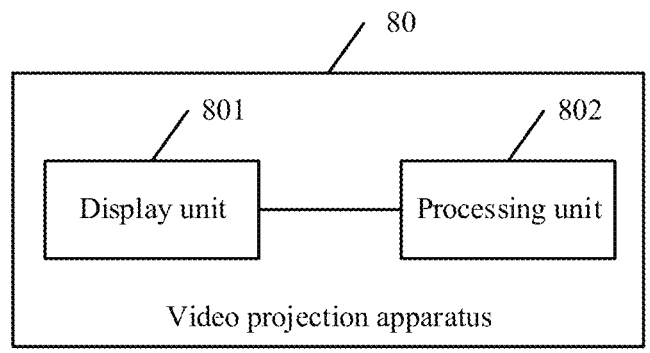
FIG. 8 is a schematic structural diagram of a video projection apparatus according to another exemplary embodiment of this application.

Referring to FIG. 8, FIG. 8 is a schematic structural diagram of a video projection apparatus according to an exemplary embodiment of this application. The video projection apparatus 80 may be configured to perform corresponding steps in the video projection method shown in FIG. 2, 4 or 7. Referring to FIG. 8, the video projection apparatus 80 includes the following units:

a display unit 801, configured to play a target video in a first page of a first APP in a terminal; and a processing unit 802, configured to project, in response to detecting a screen projection triggering event in accordance with a determination that a playing progress of the target video in the first page reaches a first progress, the target video into a target screen projection device for playing in a manner that the target video continues to be played in a second page of the target screen projection device from the first progress, the processing unit 802 being further configured to continue to play the target video in the first page from a second progress in response to detecting a screen projection stopping triggering event in accordance with a determination that a playing progress of the target video in the target screen projection device reaches the second progress, the screen projection triggering event including an event making the first APP in an inactive state, and the screen projection stopping triggering event including an event making the first APP in an active state.

In an implementation, the processing unit 802 is further configured to:

generate the screen projection triggering event in accordance with a determination that the terminal detects a gravity sensing operation to make the first APP enter the inactive state during the playing of the target video in the first page; and generate the screen projection stopping triggering event in accordance with a determination that the terminal detects a gravity sensing operation to make the first APP enter the active state during the playing of the target video in the target screen projection device, the gravity sensing operation including at least one of a shaking operation and a rotation operation.

In an implementation, the processing unit 802 is further configured to:

generate the screen projection triggering event in accordance with a determination that the terminal switches from the first APP to a second APP to make the first APP enter the inactive state during the playing of the target video in the first page; and generate the screen projection stopping triggering event in accordance with a determination that the terminal switches from the second APP to the first APP to make the first APP enter the active state during the playing of the target video in the target screen projection device, the first page being any service page in the first APP in the terminal, the first APP being any APP in the terminal, and the second APP being any APP in the terminal except the first APP.

In an implementation, the processing unit 802 is further configured to:

generate the screen projection triggering event in accordance with a determination that the first APP is switched from foreground running to background running so as to enter the inactive state during the playing of the target video in the first page; and generate the screen projection stopping triggering event in accordance with a determination that the first APP is switched from the background running to the foreground running so as to enter the active state during the playing of the target video in the target screen projection device, the first page being any service page in the first APP in the terminal, and the first APP being any APP in the terminal.

In an implementation, the terminal is provided with a touch screen control. The screen projection control refers to a control beyond a service scope of the first APP. The processing unit 802 is further configured to:

generate the screen projection triggering event in accordance with a determination that the screen projection control is triggered to make the first APP enter the inactive state during the playing of the target video in the first page; and generate the screen projection stopping triggering event in accordance with a determination that the screen projection control is triggered to make the first APP enter the active state during the playing of the target video in the target screen projection device.

In an implementation, the first page includes a playing window, including a progress indication axis, and a progress pointer is set in the progress indication axis, and moves along the progress indication axis with the changing of the playing progress of the target video; and the playing progress of the target video in the target screen projection device changes with the movement of the progress pointer in accordance with a determination that the progress pointer is subjected to a dragging operation to move along the progress indication axis during the playing of the target video in the target screen projection device.

In an implementation, projection prompting information is displayed in the first page, including a definition control option, and the display unit 801 is further configured to display a definition list in accordance with a determination that the definition control option is selected, the definition list including at least one definition identifier, and a first definition identifier corresponding to a playing definition of the target video in the target screen projection device being highlighted in the definition list; and switch the playing definition of the target video in the target screen projection device from a first definition to a second definition in v that a second definition identifier in the definition list is selected, the first definition identifier being a definition identifier in the definition list, and the second definition identifier being any definition identifier in the definition list except the first definition identifier.

In an implementation, the first page includes a playing window, including an attribute control region; or, the terminal includes an attribute control button;

the display unit 801 is further configured to display an attribute indication identifier in the playing window in response to detecting a control operation acting on the attribute control region or the attribute control button during the playing of the target video in the playing window, the attribute indication identifier being used for indicating an attribute value, a playing attribute of the target video in the target screen projection device being controlled by the attribute value indicated by the attribute indication identifier, and the attribute indication identifier including at least one of a volume indication identifier and a brightness indication identifier.

In an implementation, the display unit 801 is further configured to display a historical playing record, the historical playing record including a playing progress of the target video, and the playing progress of the target video referring to a fused progress of the playing progress of the target video in the first page and the playing progress of the target video in the target screen projection device.

In an implementation, projection prompting information is displayed in the first page, including a screen projection device switching option, and the display unit 801 is further configured to display a screen projection device selection page in accordance with a determination that the screen projection device switching option is selected, a device identifier of at least one screen projection device being displayed in the screen projection device selection page; and continue to play the target video in another screen projection device from the playing progress recorded in the historical playing record in accordance with a determination that a device identifier of the other screen projection device in the screen projection device selection page except the target screen projection device is selected, a priority of the target screen projection device being higher than that of the other screen projection device, a device identifier of the target screen projection device being displayed in the screen projection device selection page in a different manner, and the displaying in a different manner including: displaying the device identifier of the target screen projection device at a key position in the screen projection device selection page, or, displaying the device identifier of the target screen projection device in the screen projection device selection page in a first color and the device identifier of the other screen projection device in the screen projection device selection page in a second color, or, synchronously displaying a priority label in a display row of the device identifier of the target screen projection device.

In an implementation, the video projection apparatus 80 may be configured to perform corresponding steps in the method shown in FIG. 6 or 7. Referring to FIG. 8, the video projection apparatus 80 includes the following units:

a display unit 801, configured to play a target video in a second page from a first progress in response to a screen projection instruction of a terminal, the screen projection instruction being sent in accordance with a determination that a playing progress of the target video in a first page of a first APP in the terminal reaches the first progress and a screen projection triggering event is detected; and a processing unit 802, configured to return, in response to a screen projection stopping instruction of the terminal in accordance with a determination that a playing progress of the target video in the second page reaches a second progress, the target video to the terminal for playing in a manner that the target video continues to be played in the first page of the terminal from the second progress, the screen projection stopping instruction being sent by the terminal in response to detecting a screen projection stopping triggering event, the screen projection triggering event including an event making the first APP in an inactive state, and the screen projection stopping triggering event including an event making the first APP in an active state.

In an implementation, the processing unit 802 is further configured to:

synchronize the playing progress of the target video to the terminal in real time during the playing of the target video in the second page; or, upload the playing progress of the target video to a server such that the terminal acquires the playing progress of the target video from the server.

According to an embodiment of this application, units in the video projection apparatus 80 shown in FIG. 8 may be separately or wholly combined into one or several other units, or one (or more) of the units herein may further be divided into a plurality of units of smaller functions. In this way, same operations can be implemented, and implementation of the technical effects of the embodiments of this application is not affected. The foregoing units are divided based on logical functions. In an actual application, a function of one unit may also be implemented by a plurality of units, or functions of a plurality of units are implemented by one unit. In other embodiments of this application, the video projection apparatus 80 may also include other units. During actual application, the functions may also be cooperatively implemented by other units and may be cooperatively implemented by a plurality of units. According to another embodiment of this application, a computer program (including a program code) capable of performing each step involved in the corresponding method shown in FIG. 2, 4, 6 or 7 may be run in a general-purpose computing device of a general-purpose computer including a processing element and a storage element, such as a central processing unit (CPU), a random access memory (RAM), or a read-only memory (ROM), to structure the video projection apparatus 80 shown in FIG. 8 and implement the video projection method in this embodiment of this application. The computer program may be recorded in, for example, a computer-readable storage medium, and is loaded, through the computer-readable storage medium, and run in the terminal 101 or the target screen projection device 102.

In this embodiment of this application, the target video is projected, in response to detecting the screen projection triggering event in accordance with a determination that the playing progress of the target video in the first page of the terminal reaches the first progress, into the target screen projection device for playing in a manner that the target video continues to be played in the second page of the target screen projection device from the first progress, and the terminal continues to play the target video in the first page from the second progress in response to detecting the screen projection stopping triggering event in accordance with a determination that the playing progress of the target video in the target screen projection device reaches the second progress. In this process, the screen projection triggering event includes an event making the first APP in the inactive state, and the screen projection stopping triggering event includes an event making the first APP in the active state. The terminal and the target screen projection device may be switched flexibly to play the target video through the screen projection triggering event and the screen projection stopping triggering event, so as to meet a video projection requirement. In addition, the playing progress may still be synchronized between the terminal and the target screen projection device if the first APP of the terminal is in the inactive state, to continue to play the target video respectively. Therefore, a screen projection playing effect of the video is improved effectively.

Figure 9:
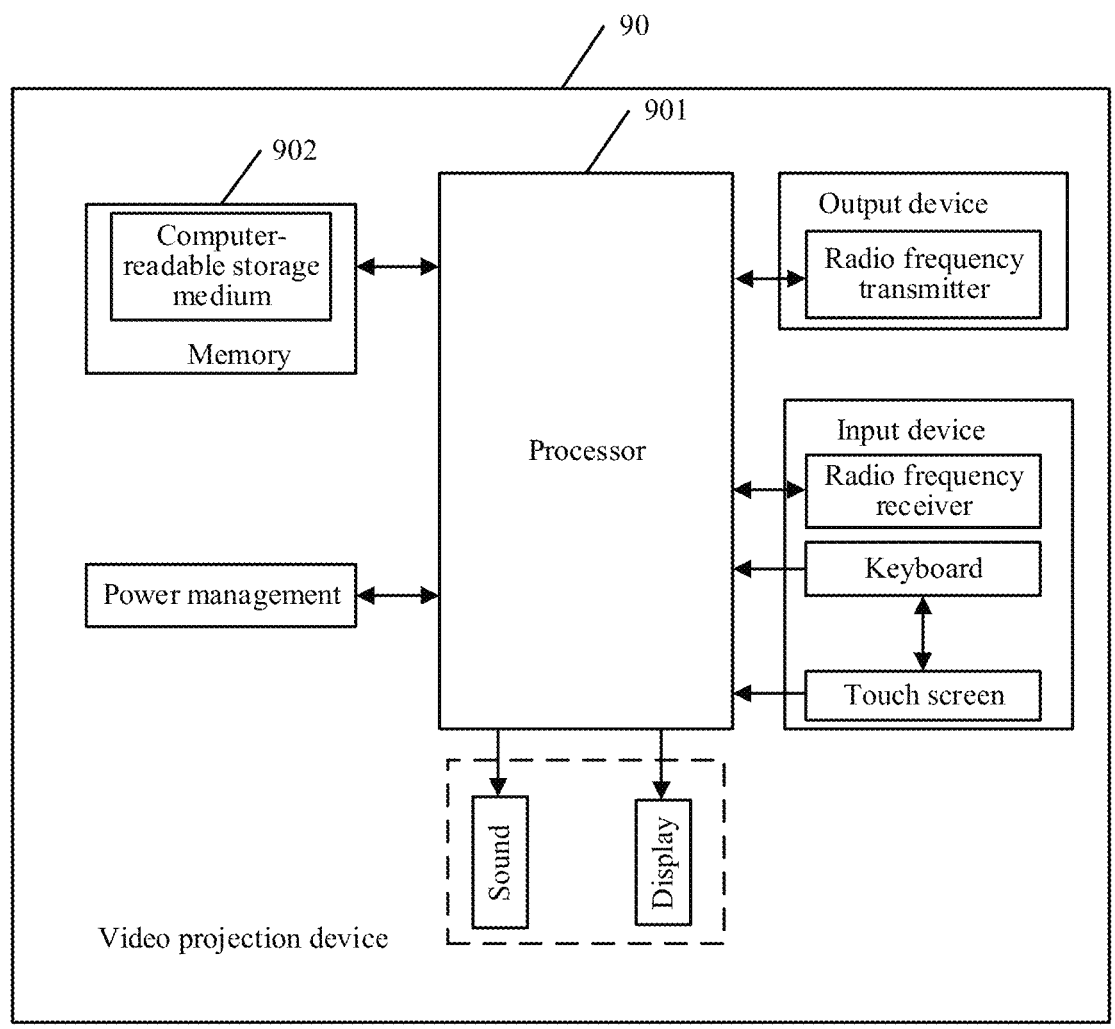
FIG. 9 is a schematic structural diagram of a video projection device according to another exemplary embodiment of this application.

Referring to FIG. 9, FIG. 9 is a schematic structural diagram of a video projection device according to an exemplary embodiment of this application. The video projection device 90 at least includes a processor 901 and a computer-readable storage medium 902. The processor 901 may be connected with the computer-readable storage medium 902 through a bus or other manners. The computer-readable storage medium 902 may be stored in a memory. The computer-readable storage medium 902 is configured to store a computer program. The computer program includes a computer instruction. The processor 901 is configured to execute the computer instruction stored in the computer-readable storage medium 902. As a computing core and control core of the video projection device 90, the processor 901 (or referred to as a CPU) is suitable for implementing the computer instruction, specifically suitable for loading and executing the computer instruction, thereby implementing a corresponding method flow or a corresponding function.

An embodiment of this application also provides a computer-readable storage medium (memory). As a storage device in the video projection device 90, the computer-readable storage medium is configured to store a computer program and data. It can be understood that the computer-readable storage medium 902 here may include a built-in storage medium of the video projection device 90, and certainly, may further include an extended storage medium supported by the video projection device 90. The computer-readable storage medium 902 provides a memory space that stores an operating system of the video projection device 90. Moreover, computer instructions suitable for the processor 901 to load and execute is further stored in the memory space. These computer instructions may be one or more computer programs (including program codes). The computer-readable storage medium 902 may be a high-speed RAM, or a non-volatile memory, such as at least one disk memory, or at least one computer-readable storage medium away from the processor 901.

In an implementation, the video projection device 90 may be the terminal 101 shown in FIG. 1. A first computer instruction is stored in the computer-readable storage medium 902. The processor 901 loads and execute the first computer instruction stored in the computer-readable storage medium 902, so as to implement corresponding steps in the embodiment of the video projection method. During specific implementation, the first computer instruction in the computer-readable storage medium 902 is loaded and executed by the processor 901 to implement the following steps:

playing a target video in a first page of a first APP in a terminal;

projecting, in response to detecting a screen projection triggering event in accordance with a determination that a playing progress of the target video in the first page reaches a first progress, the target video into a target screen projection device for playing in a manner that the target video continues to be played in a second page of the target screen projection device from the first progress; and continuing to play the target video in the first page from a second progress in response to detecting a screen projection stopping triggering event in accordance with a determination that a playing progress of the target video in the target screen projection device reaches the second progress, the screen projection triggering event including an event making the first APP in an inactive state, and the screen projection stopping triggering event including an event making the first APP in an active state.

A specific implementation of each step may refer to each above-mentioned embodiment, and will not be elaborated herein. In this embodiment of this application, the target video is projected, in response to detecting the screen projection triggering event in accordance with a determination that the playing progress of the target video in the first page of the terminal reaches the first progress, into the target screen projection device for playing in a manner that the target video continues to be played in the second page of the target screen projection device from the first progress, and the terminal continues to play the target video in the first page from the second progress in response to detecting the screen projection stopping triggering event in accordance with a determination that the playing progress of the target video in the target screen projection device reaches the second progress. In this process, the screen projection triggering event includes an event making the first APP in the inactive state, and the screen projection stopping triggering event includes an event making the first APP in the active state. The terminal and the target screen projection device may be switched flexibly to play the target video through the screen projection triggering event and the screen projection stopping triggering event, so as to meet a video projection requirement. In addition, the playing progress may still be synchronized between the terminal and the target screen projection device if the first APP of the terminal is in the inactive state, to continue to play the target video respectively. Therefore, a screen projection playing effect of the video is improved effectively.

According to an aspect of this application, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, so that the computer device performs the video projection method provided in the various implementations.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs video projecting and/or video playback. In practical application, the foregoing functions may be allocated to and completed by different functional modules according to requirements, that is, an inner structure of a device is divided into different functional modules to implement all or a part of the functions described above.

What is claimed is:

1. A video projection method performed at an electronic device, the method comprising:
    playing a target video in a first page of a first application (APP) of the electronic device, wherein the first page comprises a playing window that includes a progress indication axis, the progress indicator axis having a progress pointer that moves along the progress indication axis with the changing of the playing progress of the target video;
    detecting a screen projection triggering event at the electronic device when a playing progress of the target video in the first page reaches a first progress;
    in response to the detecting, causing the target video to project onto a target screen projection device so that the target video continues to be played in a second page of the target screen projection device from the first progress, wherein the playing progress of the target video in the target screen projection device changes with a movement of the progress pointer when the progress pointer is subjected to a dragging operation to move along the progress indication axis during the playing of the target video in the target screen projection device; and
    in response to detecting a screen projection stopping triggering event at the electronic device when a playing progress of the target video in the target screen projection device reaches a second progress, continuing to play the target video in the first page of the first APP of the electronic device starting from the second progress, wherein:
    the screen projection triggering event comprises an event that deactivates the first APP; and
    the screen projection stopping triggering event comprises an event that activates the first APP.

2. The method according to claim 1, further comprising:
    generating the screen projection triggering event in accordance with a detection of a first gravity sensing operation that makes the first APP enter the inactive state during the playing of the target video in the first page; and
    generating the screen projection stopping triggering event in accordance with a detection of a second gravity sensing operation that makes the first APP enter the active state during the playing of the target video in the target screen projection device, wherein:
    each of the first gravity sensing operation and the second gravity sensing operation comprises at least one of a shaking operation or a rotation operation.

3. The method according to claim 1, further comprising:
    generating the screen projection triggering event when the electronic device switches from the first APP to a second APP to make the first APP enter the inactive state during the playing of the target video in the first page; and generating the screen projection stopping triggering event when the electronic device switches from the second APP to the first APP to make the first APP enter the active state during the playing of the target video in the target screen projection device, wherein:

the first page is any service page in the first APP in the electronic device, the first APP is any APP in the terminal, and the second APP is any APP in the terminal except the first APP.

4. The method according to claim 1, further comprising:
generating the screen projection triggering event in accordance with a determination that the first APP is switched from foreground running to background running so as to enter the inactive state during the playing of the target video in the first page; and generating the screen projection stopping triggering event in accordance with a determination that the first APP is switched from the background running to the foreground running so as to enter the active state during the playing of the target video in the target screen projection device, the first page being any service page in the first APP in the terminal, and the first APP being any APP in the terminal.

5. The method according to claim 1, further comprising:
generating the screen projection triggering event in response to detecting that a screen projection control is triggered to make the first APP enter the inactive state during the playing of the target video in the first page; and generating the screen projection stopping triggering event in response to detecting that the screen projection control is triggered to make the first APP enter the active state during the playing of the target video in the target screen projection device.

6. The method according to claim 1, further comprising displaying projection prompting information in the first page, the projection prompting information comprising a video image definition control option, and the method further comprises:

in accordance with user selection of the definition control option, displaying a definition list, the definition list comprising at least one definition identifier, and a first definition identifier corresponding to a playing definition of the target video in the target screen projection device is being highlighted in the definition list; and in accordance with user selection of a second definition identifier in the definition list, switching the playing definition of the target video in the target screen projection device from a first definition to a second definition, distinct from the first definition.

7. The method according to claim 1, wherein the first page comprises a playing window, comprising an attribute control region; or, the terminal comprises an attribute control button; and the method further comprises:

displaying an attribute indication identifier in the playing window in response to detecting a control operation acting on the attribute control region or the attribute control button during the playing of the target video in the playing window, the attribute indication identifier being used for indicating an attribute value, a playing attribute of the target video in the target screen projection device being controlled by the attribute value indicated by the attribute indication identifier; and the attribute indication identifier comprising at least one of a volume indication identifier and a brightness indication identifier.

8. The method according to claim 1, further comprising:
displaying a historical playing record, the historical playing record comprising a playing progress of the target video, and the playing progress of the target video referring to a combined progress of the playing progress of the target video in the first page and the playing progress of the target video in the target screen projection device.

9. The method according to claim 8, further comprising:
displaying projection prompting information in the first page, the projection prompting information comprising a screen projection device switching option;

in accordance with user selection of the screen projection device switching option, displaying a screen projection device selection page that includes a device identifier of at least one screen projection device;

receiving user selection of a device identifier corresponding to a first screen projection device, distinct from the target screen projection device; and in accordance with the user selection of the device identifier corresponding to the first screen projection device, continuing to play the target video in the first screen projection device from the playing progress recorded in the historical playing record.

10. The method of claim 9, wherein:
the target screen projection device has a higher priority than the first screen projection device; and the method further comprises displaying a device identifier of the target screen projection device in a manner that is distinct from a manner in which the device identifier corresponding to the first screen projection device is displayed.

11. The method of claim 10, wherein displaying the device identifier of the target screen projection device in a manner that is distinct from the manner in which the device identifier corresponding to the first screen projection device is displayed comprises one or more of:

displaying the device identifier of the target screen projection device at a key position in the screen projection device selection page; or displaying the device identifier of the target screen projection device in the screen projection device selection page in a first color and the device identifier of the other screen projection device in the screen projection device selection page in a second color that is distinct from the first color; or synchronously displaying a priority label in a display row of the device identifier of the target screen projection device.

12. An electronic device, comprising:
one or more processors; and memory storing one or more programs, the one or more programs comprising instructions that, when executed by the one or more processors, cause the one or more processors to perform operations comprising:

playing a target video in a first page of a first application (APP) of the electronic device, wherein the first page comprises a playing window that includes a progress indication axis, the progress indicator axis having a progress pointer that moves along the progress indication axis with the changing of the playing progress of the target video;

detecting a screen projection triggering event at the electronic device when a playing progress of the target video in the first page reaches a first progress;

in response to the detecting, causing the target video to project onto a target screen projection device so that the target video continues to be played in a second page of the target screen projection device from the first progress, wherein the playing progress of the target video in the target screen projection device changes with a movement of the progress pointer when the progress pointer is subjected to a dragging operation to move along the progress indication axis during the playing of the target video in the target screen projection device; and in response to detecting a screen projection stopping triggering event at the electronic device when a playing progress of the target video in the target screen projection device reaches a second progress, continuing to play the target video in the first page of the first APP of the electronic device starting from the second progress, wherein:

the screen projection triggering event comprises an event that deactivates the first APP; and the screen projection stopping triggering event comprises an event that activates the first APP.

13. The electronic device according to claim 12, the operations further comprising:

generating the screen projection triggering event in accordance with a detection of a first gravity sensing operation that makes the first APP enter the inactive state during the playing of the target video in the first page; and generating the screen projection stopping triggering event in accordance with a detection of a second gravity sensing operation that makes the first APP enter the active state during the playing of the target video in the target screen projection device, wherein:

each of the first gravity sensing operation and the second gravity sensing operation comprises at least one of a shaking operation or a rotation operation.

14. The electronic device according to claim 12, the operations further comprising:

generating the screen projection triggering event when the electronic device switches from the first APP to a second APP to make the first APP enter the inactive state during the playing of the target video in the first page; and generating the screen projection stopping triggering event when the electronic device switches from the second APP to the first APP to make the first APP enter the active state during the playing of the target video in the target screen projection device, wherein:

the first page is any service page in the first APP in the electronic device, the first APP is any APP in the terminal, and the second APP is any APP in the terminal except the first APP.

15. The electronic device according to claim 12, the operations further comprising:

generating the screen projection triggering event in accordance with a determination that the first APP is switched from foreground running to background running so as to enter the inactive state during the playing of the target video in the first page; and generating the screen projection stopping triggering event in accordance with a determination that the first APP is switched from the background running to the foreground running so as to enter the active state during the playing of the target video in the target screen projection device, wherein:

the first page being any service page in the first APP in the terminal, and the first APP being any APP in the terminal.

16. The electronic device according to claim 12, the operations further comprising:

generating the screen projection triggering event in response to detecting that a screen projection control is triggered to make the first APP enter the inactive state during the playing of the target video in the first page; and generating the screen projection stopping triggering event in response to detecting that the screen projection control is triggered to make the first APP enter the active state during the playing of the target video in the target screen projection device.

17. A non-transitory computer-readable storage medium, storing a computer program, the computer program, when executed by one or more processors of an electronic device, cause the one or more processors to perform operations comprising:

playing a target video in a first page of a first application (APP) of the electronic device, wherein the first page comprises a playing window that includes a progress indication axis, the progress indicator axis having a progress pointer that moves along the progress indication axis with the changing of the playing progress of the target video;

detecting a screen projection triggering event at the electronic device when a playing progress of the target video in the first page reaches a first progress;

in response to the detecting, causing the target video to project onto a target screen projection device so that the target video continues to be played in a second page of the target screen projection device from the first progress, wherein the playing progress of the target video in the target screen projection device changes with a movement of the progress pointer when the progress pointer is subjected to a dragging operation to move along the progress indication axis during the playing of the target video in the target screen projection device; and in response to detecting a screen projection stopping triggering event at the electronic device when a playing progress of the target video in the target screen projection device reaches a second progress, continuing to play the target video in the first page of the first APP of the electronic device starting from the second progress, wherein:

the screen projection triggering event comprises an event that deactivates the first APP; and the screen projection stopping triggering event comprises an event that activates the first APP.

18. The non-transitory computer-readable storage medium according to claim 17, the operations further comprising: displaying a historical playing record, the historical playing record comprising a playing progress of the target video, and the playing progress of the target video referring to a combined progress of the playing progress of the target video in the first page and the playing progress of the target video in the target screen projection device.

19. The non-transitory computer-readable storage medium according to claim 18, the operations further comprising:

displaying projection prompting information in the first page, the projection prompting information comprising a screen projection device switching option;

in accordance with user selection of the screen projection device switching option, displaying a screen projection device selection page that includes a device identifier of at least one screen projection device;

receiving user selection of a device identifier corresponding to a first screen projection device, distinct from the target screen projection device; and in accordance with the user selection of the device identifier corresponding to the first screen projection device, continuing to play the target video in the first screen projection device from the playing progress recorded in the historical playing record.

20. The electronic device according to claim 12, the operations further comprising:

displaying a historical playing record, the historical playing record comprising a playing progress of the target video, and the playing progress of the target video referring to a combined progress of the playing progress of the target video in the first page and the playing progress of the target video in the target screen projection device.

* * * * *